(12) United States Patent
Li et al.

(10) Patent No.: US 10,359,575 B1
(45) Date of Patent: Jul. 23, 2019

(54) OPTICAL FIBER CONNECTOR FERRULE HAVING CURVED EXTERNAL ALIGNMENT SURFACE

(71) Applicant: NANOPRECISION PRODUCTS, INC., El Segundo, CA (US)

(72) Inventors: Shuhe Li, Pasadena, CA (US); Robert Ryan Vallance, Newbury Park, CA (US); Michael K. Barnoski, Pacific Palisades, CA (US)

(73) Assignee: NANOPRECISION PRODUCTS, INC., Camarillo, CA (US)

( * ) Notice: Subject to any disclaimer, the term of this patent is extended or adjusted under 35 U.S.C. 154(b) by 1804 days.

(21) Appl. No.: 13/861,375

(22) Filed: Apr. 11, 2013

Related U.S. Application Data

(60) Provisional application No. 61/623,029, filed on Apr. 11, 2012, provisional application No. 61/699,125, filed on Sep. 10, 2012.

(51) Int. Cl.
*G02B 6/38* (2006.01)

(52) U.S. Cl.
CPC .......... *G02B 6/3822* (2013.01); *G02B 6/389* (2013.01); *G02B 6/3825* (2013.01); *G02B 6/3855* (2013.01)

(58) Field of Classification Search
CPC .. G02B 6/3885; G02B 6/3878; G02B 6/3869; G02B 6/3825; G02B 6/3839
USPC ......................................................... 385/59
See application file for complete search history.

(56) References Cited

U.S. PATENT DOCUMENTS

| 5,719,978 | A | 2/1998 | Kakii et al. |
| 6,004,046 | A | 12/1999 | Sawada |
| 6,168,317 | B1 | 1/2001 | Shahid |
| 6,276,840 | B1 | 8/2001 | Weiss et al. |
| 6,419,810 | B1 | 7/2002 | Tanaka et al. |
| 7,255,496 | B2 | 8/2007 | Narayan et al. |
| 2002/0168149 | A1 | 11/2002 | Nakura et al. |
| 2003/0142920 | A1 | 7/2003 | Dallas et al. |
| 2004/0114877 | A1 | 6/2004 | Barnoski et al. |

(Continued)

FOREIGN PATENT DOCUMENTS

| DE | 3930062 | 3/1991 |
| EP | 1257012 | 11/2002 |

(Continued)

OTHER PUBLICATIONS

International Search Report of Counterpart PCT International Application No. PCT/US2013/036261.

(Continued)

*Primary Examiner* — Jerry Blevins
(74) *Attorney, Agent, or Firm* — Liu & Liu

(57) ABSTRACT

A ferrule for an optical fiber connector has an external surface for alignment with a complementary surface of an alignment sleeve (i.e., the inside surface of a generally cylindrical or tubular sleeve). The external surface of the ferrule is generally cylindrical, having a sectional contact surface profile that is generally oval in shape. More specifically, a plurality of points of contact between the ferrule and the sleeve are defined along a curve in cross-section, wherein the center of curvature at each of the contact points along this contact point curve (i.e., the curve containing contact points that contribute to alignment) does not lie in the plane of the axis of the array of optical fibers.

21 Claims, 24 Drawing Sheets

(56) References Cited

U.S. PATENT DOCUMENTS

| | | |
|---|---|---|
| 2005/0201711 A1 | 9/2005 | Koh et al. |
| 2007/0172175 A1 | 7/2007 | Imanbayev et al. |
| 2013/0034328 A1* | 2/2013 | Galeotti .................. G02B 6/30 |
| | | 385/93 |
| 2013/0195406 A1* | 8/2013 | Cooke ............... B29C 45/14467 |
| | | 385/72 |

FOREIGN PATENT DOCUMENTS

| | | |
|---|---|---|
| EP | 1596231 | 11/2005 |
| EP | 1308760 | 7/2006 |
| JP | S52072240 | 6/1977 |
| JP | H02154208 | 6/1990 |
| JP | H02-149901 | 12/1990 |
| JP | H07035958 | 2/1995 |
| JP | 3308266 | 7/2002 |
| JP | 2005-316281 | 11/2005 |
| JP | 2010-054945 | 3/2010 |
| RU | 37419 | 4/2004 |
| SU | 190734 | 12/1966 |
| WO | 2011/056733 | 5/2011 |

OTHER PUBLICATIONS

International Search Report of Counterpart PCT International Application No. PCT/US2013/036227.
International Search Report of Counterpart PCT International Application No. PCT/US2013/036228.

* cited by examiner

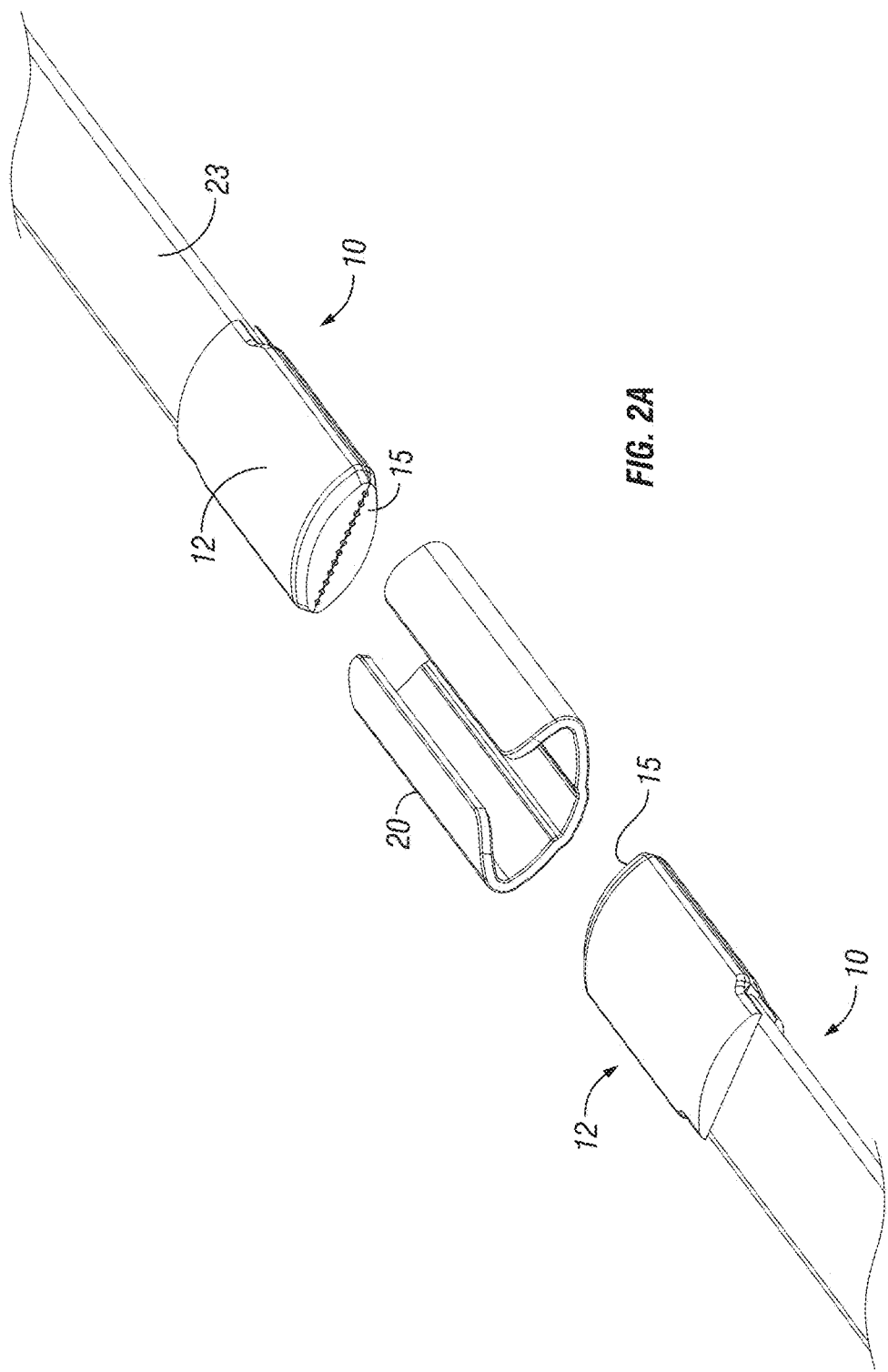

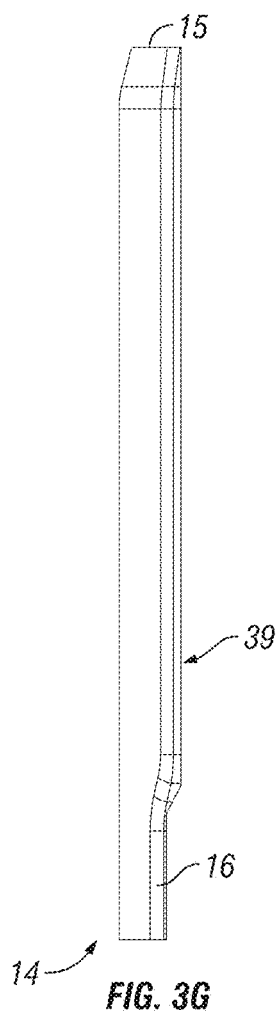
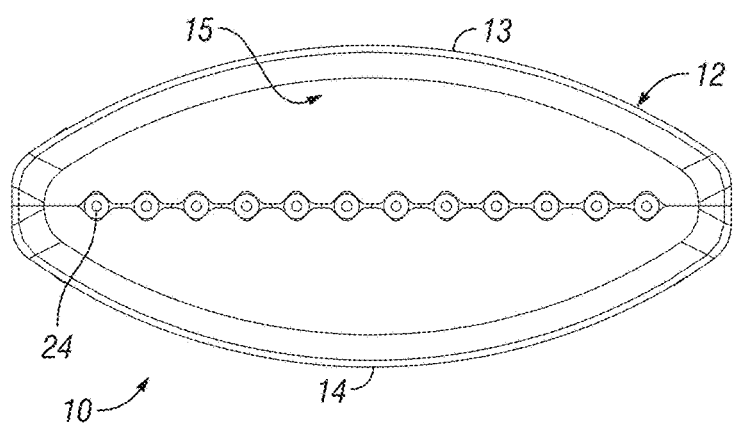
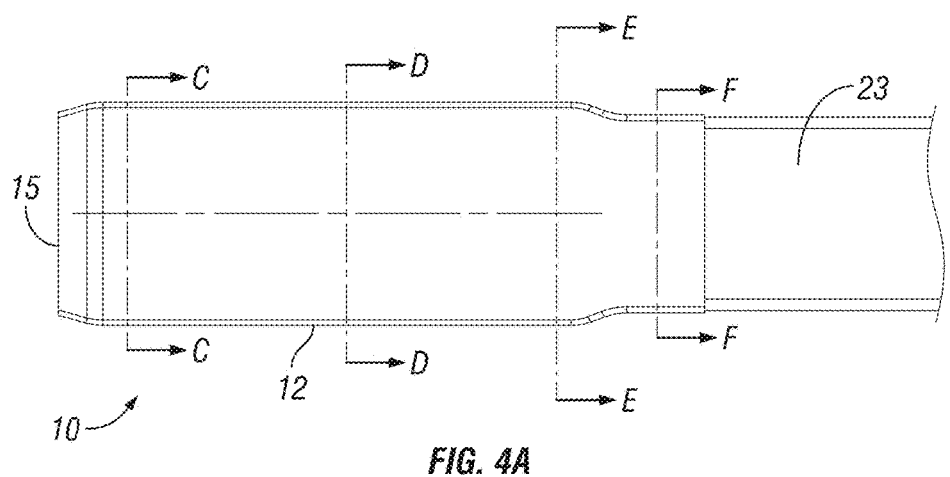
FIG. 3G
FIG. 4B
FIG. 4A

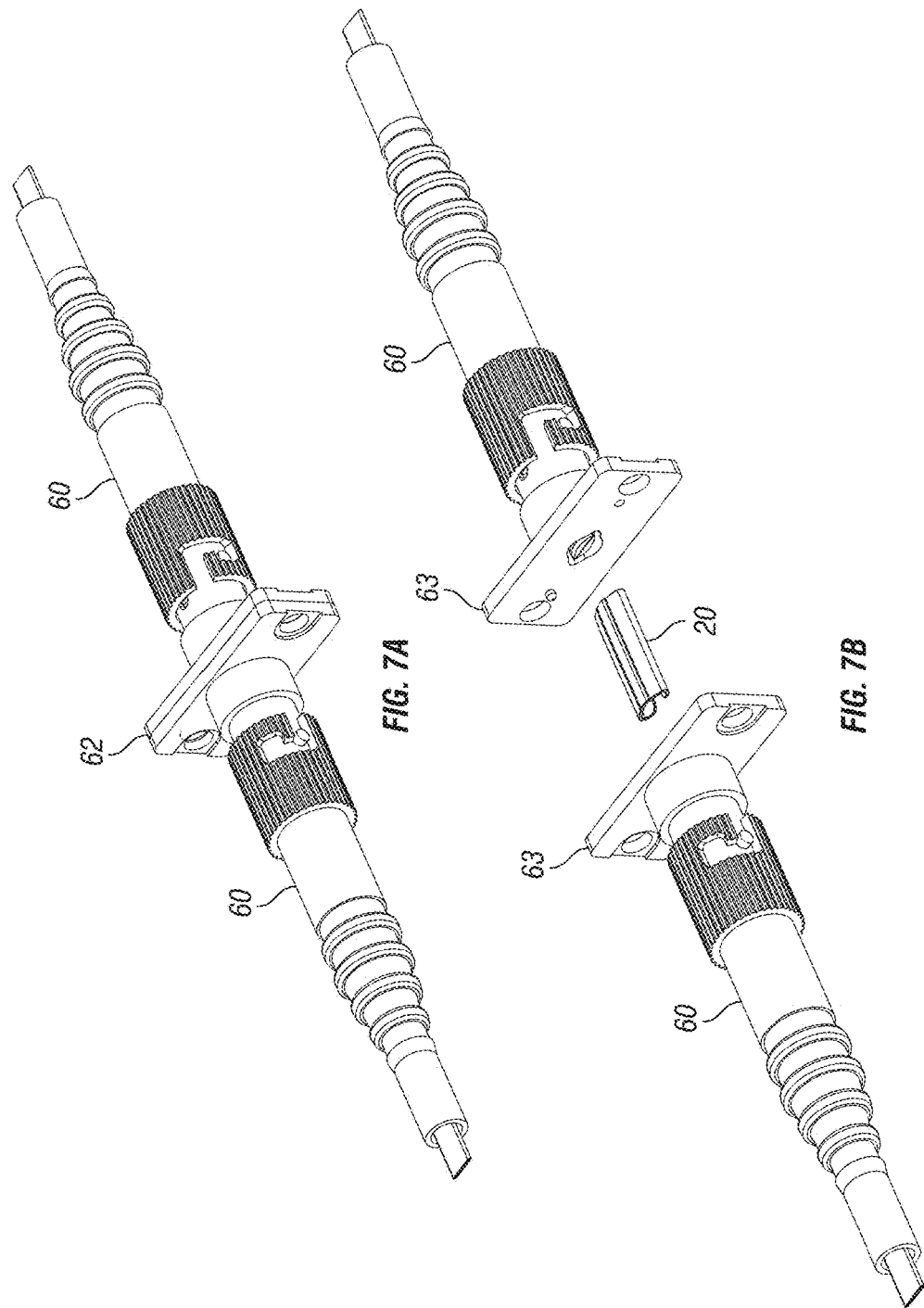

OPTICAL FIBER CONNECTOR FERRULE HAVING CURVED EXTERNAL ALIGNMENT SURFACE

PRIORITY CLAIM

This application claims the priority of U.S. Provisional Patent Application No. 61/623,029 filed on Apr. 11, 2012, and U.S. Provisional Patent Application No. 61/699,125 filed on Sep. 10, 2012, which are fully incorporated by reference as if fully set forth herein. All publications noted below are fully incorporated by reference as if fully set forth herein.

GOVERNMENT RIGHTS

This invention was made with government support under Contract No. N68335-12-C-0123 awarded by NAVAL AIR WARFARE CTR AIRCRAFT DIVISION. The government has certain rights in the invention.

BACKGROUND OF THE INVENTION

Field of the Invention

The present invention relates to optical fiber connectors, in particular ferrules in optical fiber connectors.

Description of Related Art

There are many advantages of transmitting light signal via optical fiber waveguides and the use thereof is diverse. Single or multiple fiber waveguides may be used simply for transmitting visible light to a remote location. Complex telephony and data communication systems may transmit multiple specific optical signals. These devices couple fibers in an end-to-end relationship, with the coupling being one source of light loss. Precision alignment of two polished ends of fibers is needed to ensure that overall optical loss in a fiber link is equal or less than the specified optical connector loss budget for a system. For single-mode telecommunication-grade fiber, this typically corresponds to connector fiber alignment tolerances that are less than 1000 nm. This means that in both parallel fiber and single fiber links, operating at multi-gigabit rates, the components applied to align the fibers must be assembled and fabricated with sub-micron precision.

In an optical fiber connection, an optical fiber connector terminates the end of a cable that contains one or multiple fibers, and enables quicker connection and disconnection than splicing. The connectors mechanically couple and align the cores of fibers so that light can pass end-to-end. Better connectors lose very little light due to reflection or misalignment of the fibers. Connectors, in both parallel/multiple fiber and single fiber links, operating at multi-gigabit rates must be assembled with subcomponents fabricated with sub micron precision. As if producing parts with such precision levels were not challenging enough, for the resulting end product to be economical it must be done in a fully automated, very high-speed process.

Current optical fiber connectors have not changed in basic design for many years. The basic connector unit is a connector assembly. FIG. 13 illustrates an example of an optical fiber connector 1400 for a cable 1410 containing optical fibers 1412, which is commercialized by US Conec Ltd. The connector includes an assembly of components consisting of a ferrule 1402, a ferrule housing 1404, a cable boot 1406, alignment guide pins 1408, and other hardware provided within or outside the housing (e.g., cable strain relief, crimp, biasing spring, spacer, etc.). The ferrule 1402 and the terminating end faces of the fibers 1412 are polished. The ferrule 1402 in the optical fiber connector 1400 is spring-loaded to provide an axial bias to press together the polished end faces of the fibers in two connectors in an end-to-end configuration. In most cases, the intent is to establish physical contact between coupled fibers to prevent loss of light. Physical contact avoids a trapped layer of air between two fibers, which increases connector insertion loss and reflection loss. An adaptor, not shown, is required to securely couple the ferrules of two connectors (the ferrule housing 1404 of each connector is plugged into the adaptor).

The optical fiber connector illustrated in FIG. 13 manufactured by US Conec Ltd. is purportedly in accordance with the structure disclosed in U.S. Pat. No. 5,214,730, which is assigned to Nippon Telegraph and Telephone Corporation. As illustrated in the '730 patent, the optical fiber connector receives a optical fiber ribbon cable having a plurality of individual optical fibers and maintains the individual optical fibers in a predetermined relationship. The optical fiber connector can be mated with another optical fiber connector (e.g., using an adaptor) so as to align the plurality of individual optical fibers of one optical fiber connector with the plurality of optical fibers of the other optical fiber connector.

The ferrule 1402 from US Conec Ltd. is generally in the form of a plastic block having a series of over-sized through-holes that provide sufficient clearance for inserting the terminating ends of optical fibers 1412 and alignment pins 1408 into the block. The ferrule 1402 is formed by molding of a plastic polymer that is often reinforced by glass particles. To insert the terminating ends of the multiple optical fibers 1412 through the holes in the ferrule block 1402, the protective buffer jacket (resin) layers of the optic fibers are stripped off to expose the cladding layer near the terminating ends, and the cladding layer is coated with a layer of epoxy. The terminating ends of the optical fibers are then threaded into the over-sized holes in the ferrule. The ends of the optical fibers 1412 are securely held in the ferrule 1402 upon curing of the epoxy. Similarly, the alignment pins 1408 are retained with epoxy after inserting into the oversized holes in the ferrule 1402 provided for the pins.

The above described ferrule has several significant drawbacks. The injection molded structure inherently does not hold tolerance well. The polymer is not rigid and deforms when loads (forces or moments) are applied to the fiber cable or connector housing. Polymers are also susceptible to creep and thermal expansion/contraction over longer periods of time. The clearance in the over-sized holes in the ferrule further affects tolerance of end-to-end alignment of fibers. The epoxy shrinks upon curing, which leads to bending of the plastic ferrule. Further, epoxy creeps over time, leading to pistoning or retracting of the optical fiber ends (which are pushed against the ends of adjoining fibers) within the holes in the ferrule under the applied axial bias of the spring-load in the connector. This compromises the integrity of the surface contact interface of opposing fiber end faces. These and other deficiencies result in poor resultant tolerance that is more to be desired for modern day optical fiber applications.

Currently, it is generally accepted that current fiber connectors cost too much to manufacture and the reliability and loss characteristics are more to be desired. The tolerance of the fiber connectors must improve and the cost of producing fiber connectors must decrease if fiber optics is to be the communication media of choice for short haul and very short reach applications. The relatively widespread and ever increasing utilization of optical fibers in communication systems, data processing and other signal transmission systems has created a demand for satisfactory and efficient means of inter-joining fiber terminals.

U.S. Pat. No. 7,311,449, commonly assigned to the assignee-applicant of the present invention, discloses various embodiments of ferrules that can be mass produced cost effectively by stamping. Some of those ferrules are configured for optical alignment without using alignment sleeves, relying solely on the alignment sleeves to provide alignment of the precisely shaped ferrules.

The present invention provides further improved ferrule and sleeve designs that can be incorporated in new optical fiber connectors, which results in low insertion loss and low return loss, which provides ease of use and high reliability with low environmental sensitivity, and which can be fabricated at low cost.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 2A-E illustrate various views of the coupling and optical alignment of ferrules using an alignment sleeve, in accordance with one embodiment of the present invention.

FIGS. 3A-G illustrate various views of structural details of a ferrule halve, in accordance with one embodiment of the present invention.

FIGS. 4A-F illustrate various views of structural details of the optical fiber assembly, in accordance with one embodiment of the present invention.

FIGS. 7A-E illustrate various views of an optical fiber connector adopting the inventive ferrule and sleeve, in accordance with one embodiment of the present invention.

SUMMARY OF THE INVENTION

Figure 1A:
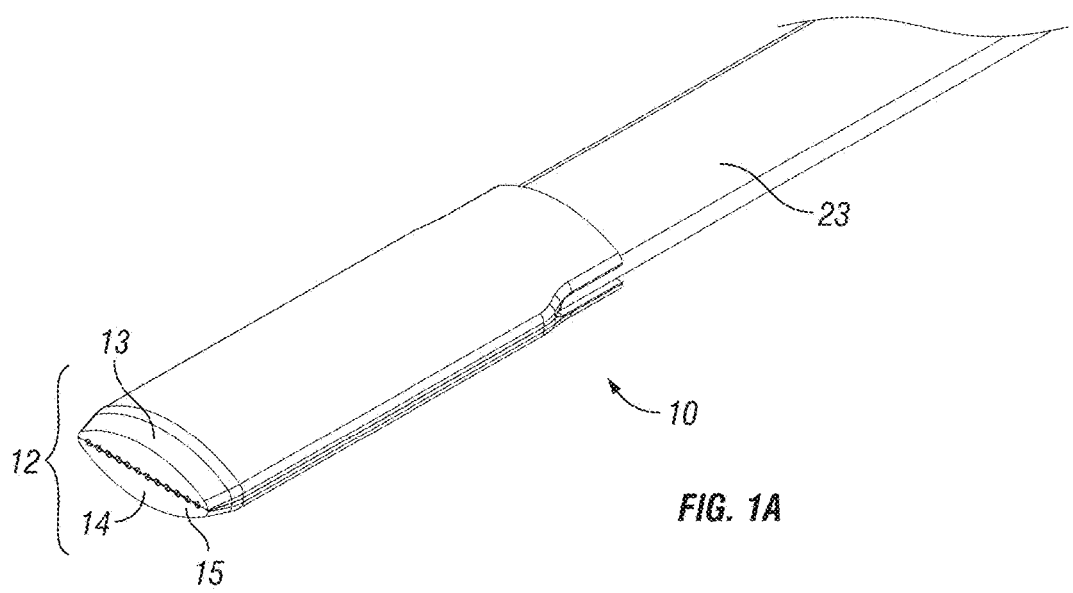
FIGS. 1A-D illustrate various views of an optical fiber assembly including a ferrule for use within an optical fiber connector, in accordance with one embodiment of the present invention.

The present invention provides a ferrule for an optical fiber connector, which overcomes many of the drawbacks of the prior art ferrules and connectors, and further improves on applicant's pin-less alignment ferrules. The ferrule in accordance with the present invention provides an optical fiber connector having an optical fiber ferrule, which results in low insertion loss and low return loss, which provides ease of use and high reliability with low environmental sensitivity, and which can be fabricated at low cost. Given the configuration of the inventive ferrules, the foot-print or form factor of the housing of the optical fiber connector using the inventive ferrule for multi-fibers can be similar to that of housings that currently use prior art cylindrical ferrules designed for only a single fiber (i.e., the inventive ferrules may be incorporated in industry standard connector housings designed for single fiber, such as SC, FC, ST, SMA, LC, Dual LC, etc., type housings.)

In one aspect of the present invention, the inventive ferrule has an external surface for alignment with a complementary surface of an alignment sleeve (i.e., the inside surface of a generally cylindrical or tubular sleeve). The external surface of the ferrule is generally cylindrical, having a sectional contact surface profile that is generally oval in shape. More specifically, a plurality of points of contact between the ferrule and the sleeve are defined along a curve in cross-section, wherein the center of curvature at each of the contact points along this contact point curve (i.e., the curve containing contact points that contribute to alignment) does not lie in the plane of the axis of the array of optical fibers. In another embodiment, the center of curvature at each of the contact points along the contact point curve does not lie in the geometric center of the array of optical fibers. For the embodiment of a symmetrical ferrule, the center of curvature at each of the alignment contact points along this contact point curve does not lie in at least one of two-orthogonal planes of symmetry of the ferrule. The planes of symmetry may be the plane of the axis of the array of optical fibers and its orthogonal plane. In other words, for a symmetric ferrule, the center of curvature at each of the contact points along the contact point curve does not lie in the geometric center. In another embodiment, all or substantially all the alignment contact points along the contact point curve are subject to the respective conditions noted above, depending on the embodiment.

In another aspect of the present invention, in a cross-section of the ferrule, the surfaces at the ends of the widest section of the ferrule are truncated so that they do not contact the sleeve. In another embodiment, the surfaces at the ends of the ferrule along the plane of the array of optical fiber axis is truncated to not contact the sleeve.

The ferrule has an open structure that has precision features formed thereon, namely open fiber alignment grooves, which can securely retain (e.g., by clamping) the optical fibers without the need for epoxy or a complementary precision part. In one embodiment, the ferrule has a body having a plurality of open grooves formed in parallel on one surface thereof for receiving and clamping at least the terminating end sections of optical fibers. In a further embodiment, grooves may be provided in the ferrule body for alignment guide pins.

In one aspect of the present invention, sleeves have a generally tubular body, which have mating surface features for ferrule alignment which are two-dimensionally varying in a sectional plane, or three-dimensionally varying including in the direction of the longitudinal axis.

In another aspect of the present invention, the ferrule components and/or sleeves are precision formed by high throughput processes, such as stamping and extrusion. In another embodiment, the ferrule components are formed by extrusion of a blank through a die.

In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass).

The ferrule in accordance with the present invention overcomes many of the deficiencies of the prior art, resulting in an optical fiber connector that results in low insertion loss and low return loss, which provides ease of use and high reliability with low environmental sensitivity, and which can be fabricated at low cost.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a ferrule for an optical fiber connector, which overcomes many of the drawbacks of the prior art ferrules and connectors, and further improves on applicant's pin-less alignment ferrules. The ferrule in accordance with the present invention provides an optical fiber connector having an optical fiber ferrule, which results in low insertion loss and low return loss, which provides ease of use and high reliability with low environmental sensitivity, and which can be fabricated at low cost. Given the configuration of the inventive ferrules, the foot-print or form factor of the housing of the optical fiber connector using the inventive ferrule for multi-fibers can be similar to that of housings that currently use prior art cylindrical ferrules designed for only a single fiber (i.e., the inventive ferrules may be incorporated in industry standard connector housings designed for single fiber, such as SC, FC, ST, SMA, LC, Dual LC, etc., type housings.)

Figure 1B:
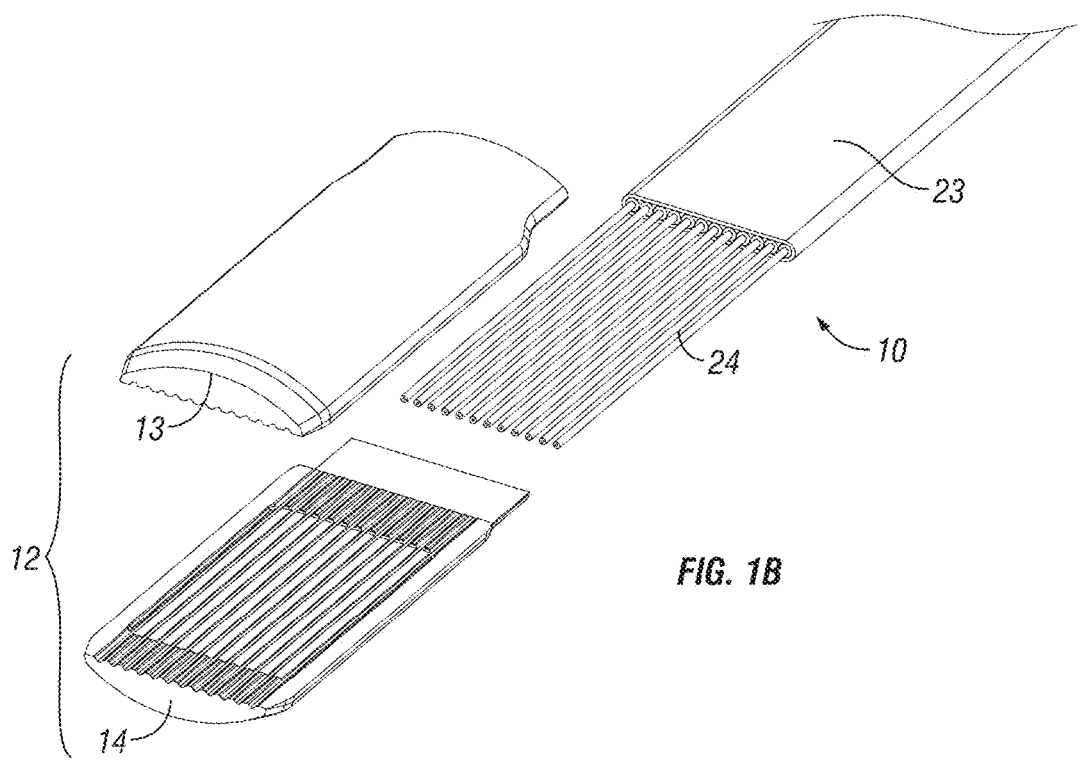
Figure 1C:
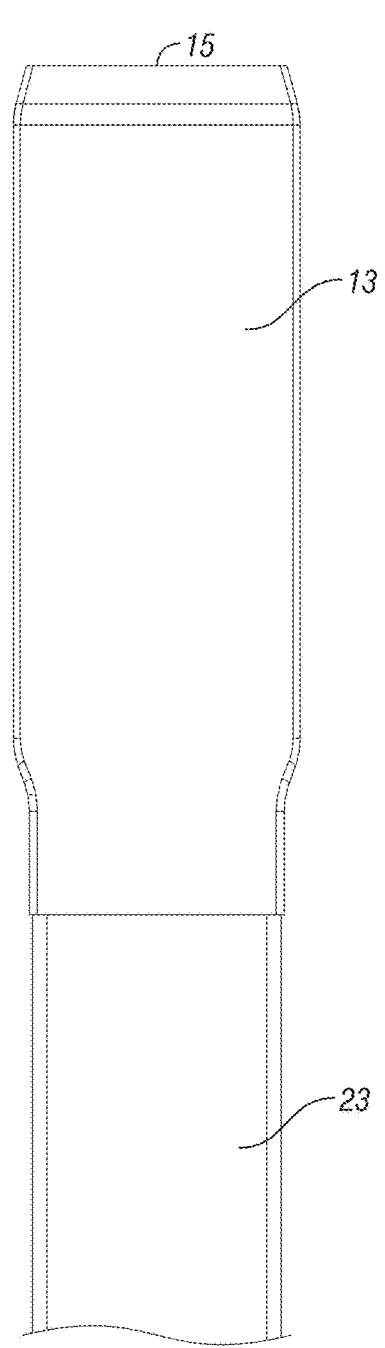
Figure 1D:
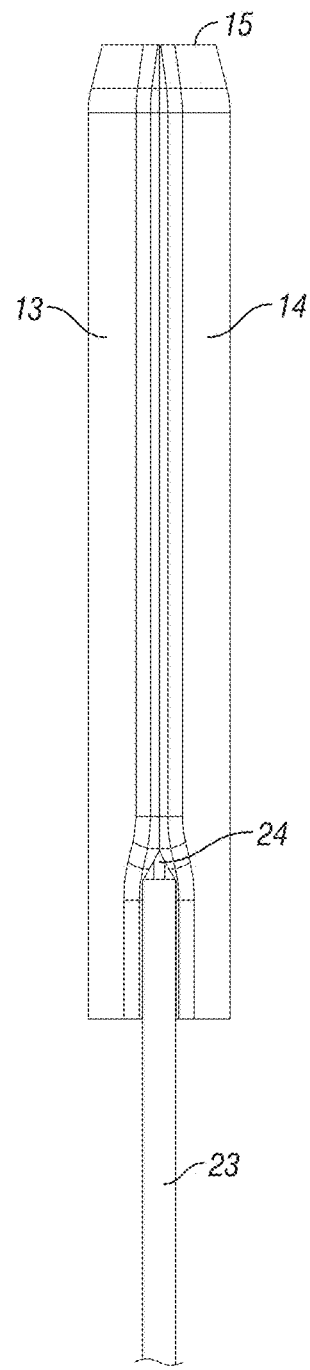
Figure 2B:
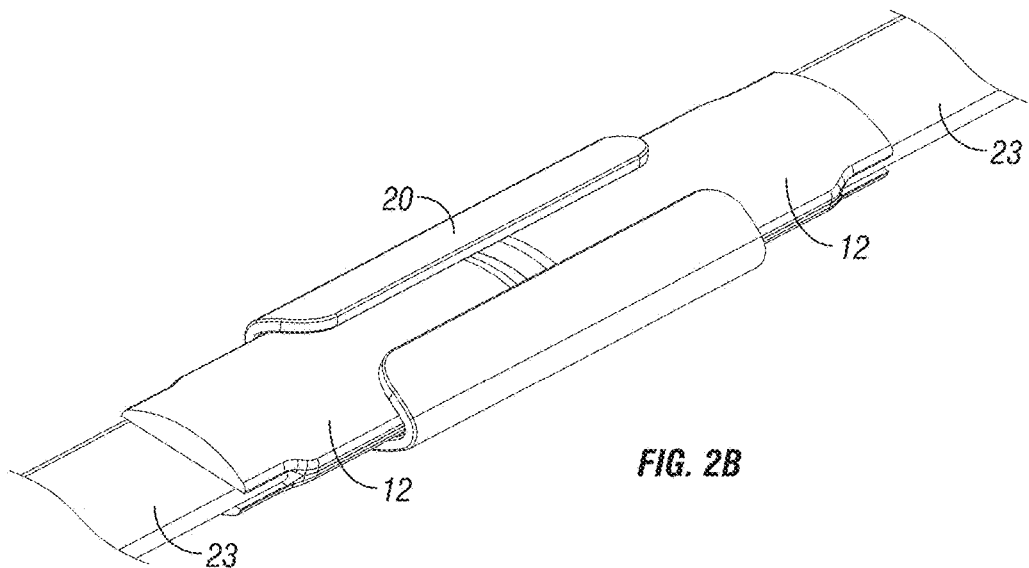
Figure 2C:
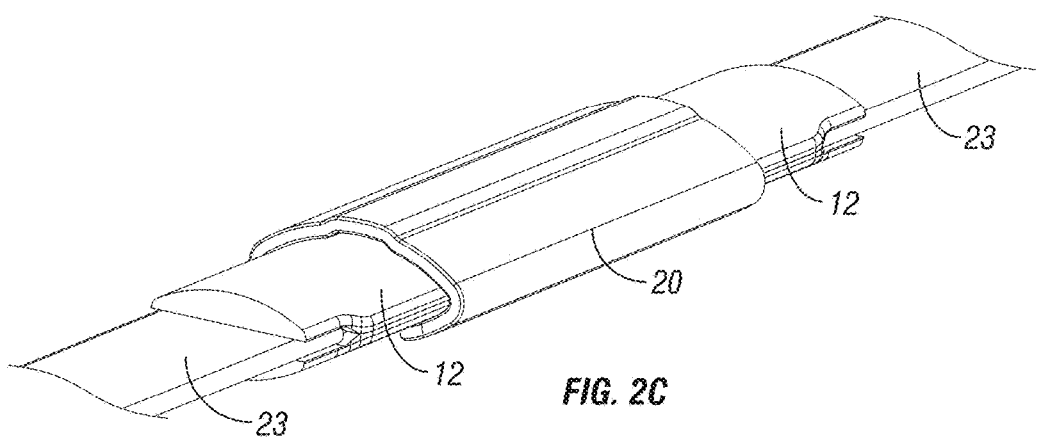
Figure 2D:
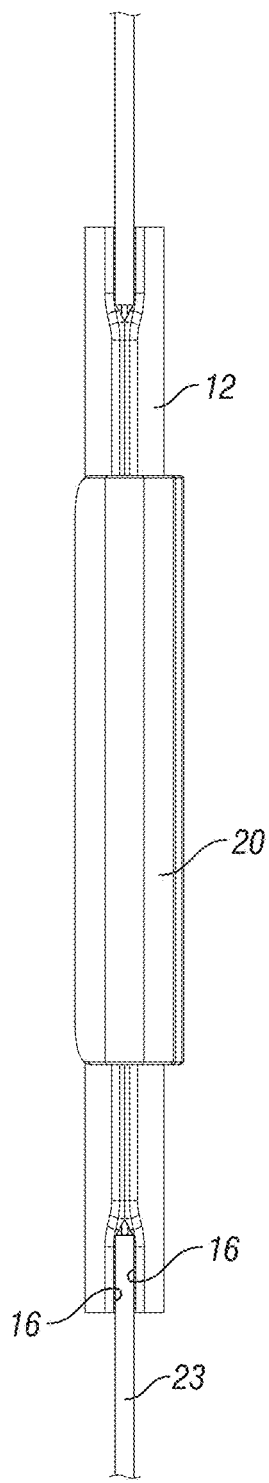
Figure 2E:
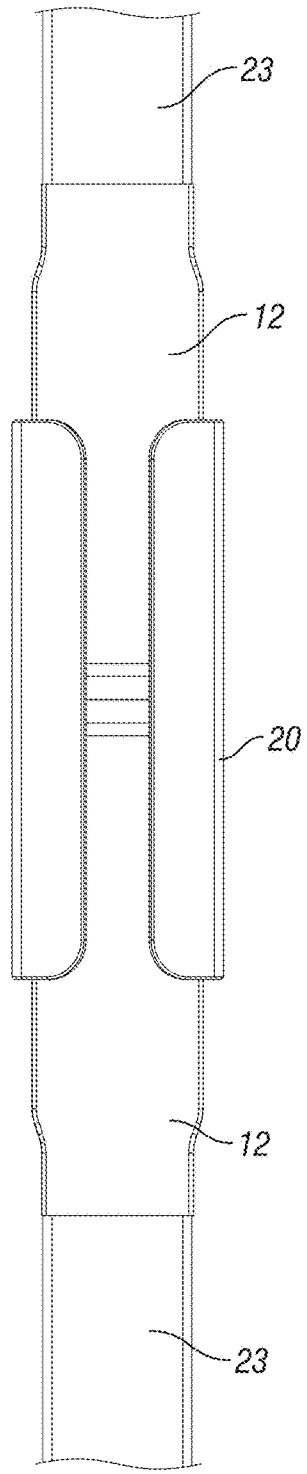
Figure 3A:
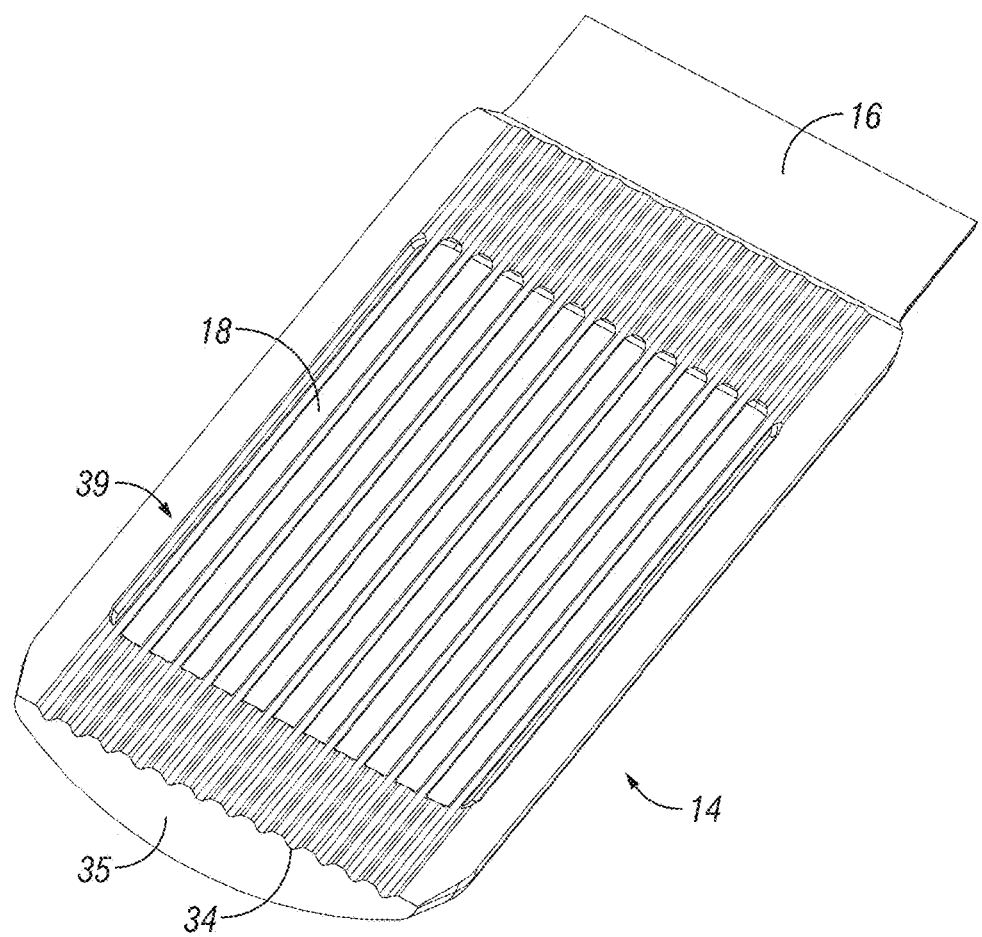
Figure 3B:
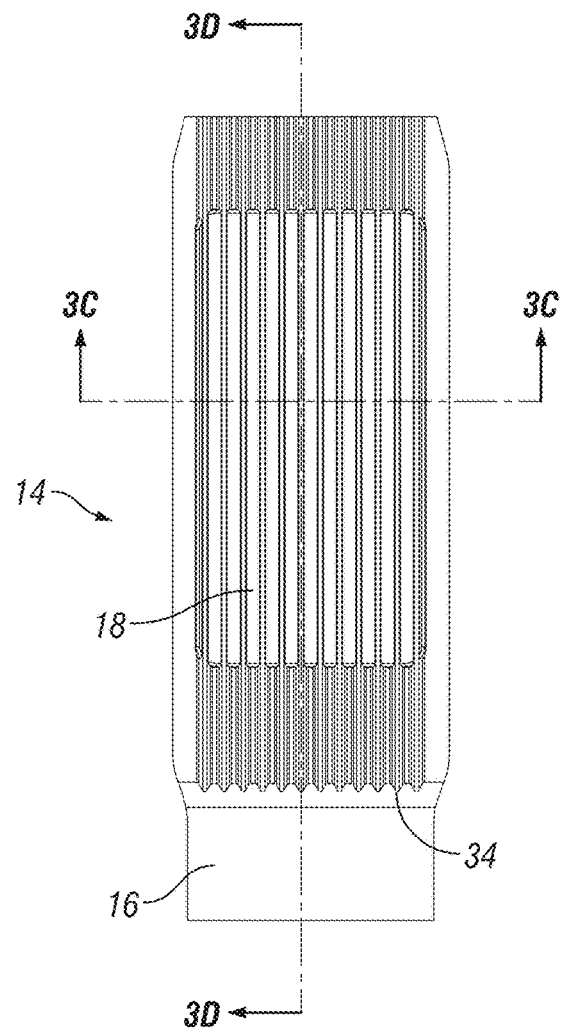
Figure 3C:
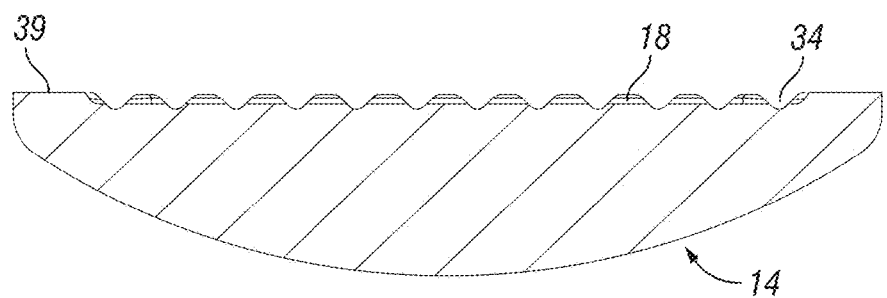
Figure 3D:
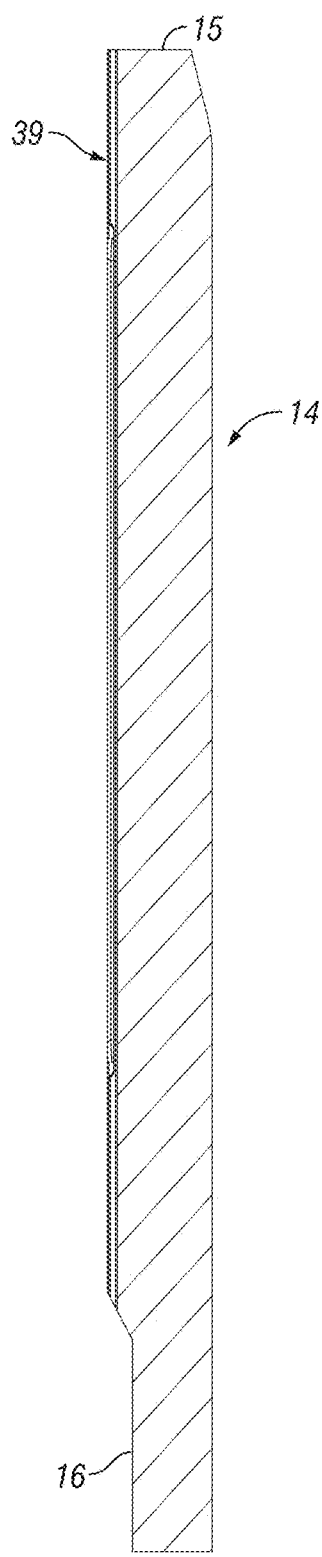
Figure 3E:
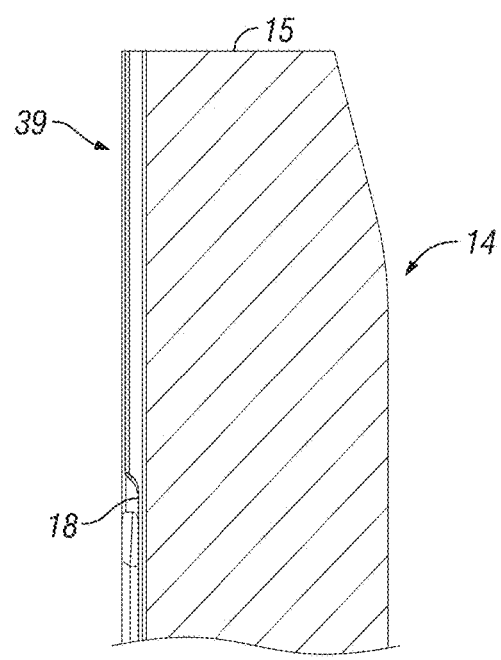
Figure 3F:
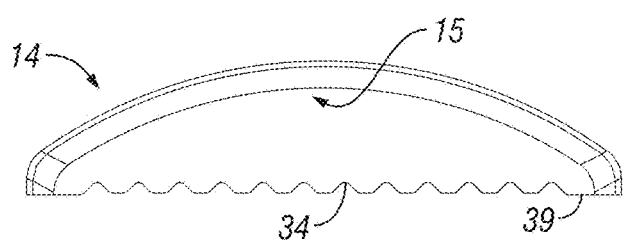

FIGS. 1A-D illustrate an optical fiber assembly 10 including a ferrule 12 for use within an optical fiber connector, in accordance with one embodiment of the present invention. The optical fiber connector 10 includes a ferrule 12, a fiber ribbon 23 including an array of optical fiber 24 (in bare form, exposed without buffer and protective jacket layers). FIG. 1B is an exploded view, FIG. 1C is top view and FIG. 1D is a side view of the optical fiber connector 10. The ferrule 12 comprising two ferrule halves 13 and 14, which are symmetrical in this embodiment. The ends of the fiber 24 are substantially flush with the end face 15 of the ferrule 10, but could protrude slightly beyond the end face (by no more than a few microns). The ferrule 12 has an overall generally cylindrical body, having a generally oval shaped cross-section.

FIGS. 2A-E illustrate the various views of coupling and optical alignment of similar ferrules 12 or similar fiber assembly 10 using an alignment sleeve 20, in accordance with one embodiment of the present invention. The sleeve 20 has an internal surface generally conforming to the exterior shape of the ferrules 12, and sized to receive the ferrules 12. The sleeve 20 has a tubular body that is generally cylindrical. The end faces of the ferrules 12 are butted against each other (with the end faces of adjoining fibers 24 butted against each other), with the corresponding fibers 24 optically aligned across the interface. In this embodiment, the sleeve 20 is a split sleeve.

Figure 4C:
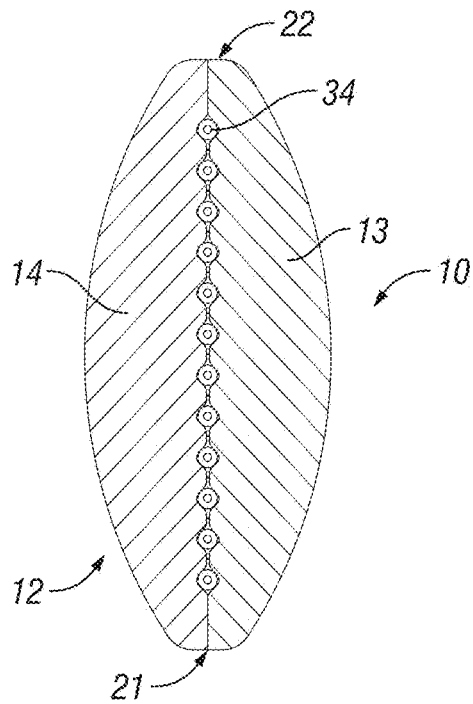
Figure 4D:
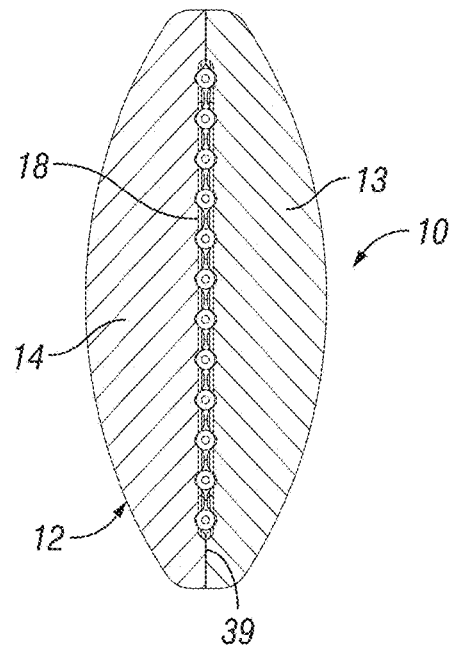
Figure 4E:
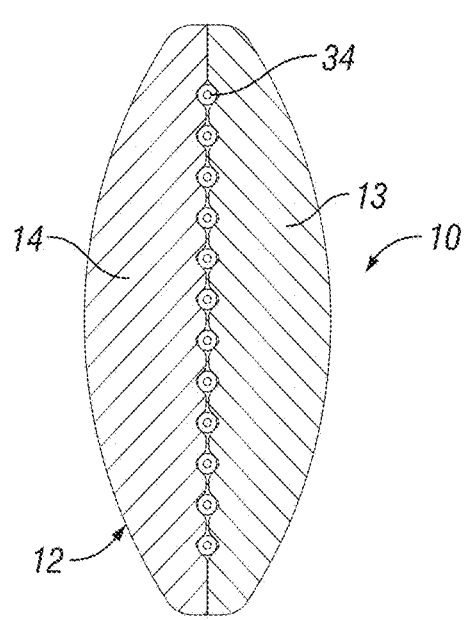
Figure 4F:
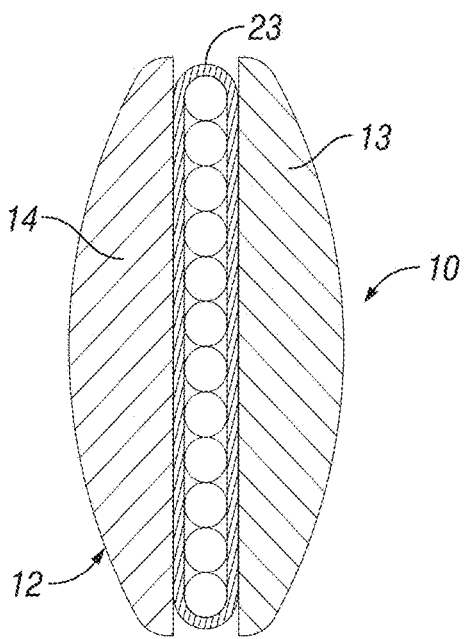

FIGS. 3A-G illustrate various views of structural details of the ferrule halve 14 (the structure of the other ferrule halve 13 being similar), in accordance with one embodiment of the present invention. A cable retention structure, comprising a plurality of parallel, longitudinal, open grooves 34 are provided on the inside surface 39 of the body of the ferrule halve 14 (the surface facing another ferrule halve 13). The central section at the surface 39 has a floor 18 at a plane between the plane of the bottoms of the grooves 34 and the highest plane of the surface 39. (See also FIG. 4D.) The bottom of the groove 34 would not be as deep in the region of the floor 18, as compared to the depth of the groove 34 outside this regions, e.g., near the end face region 15, for example. This is to improve manufacturability, e.g., if the ferrule halve 14 is formed by stamping a malleable metal. At the end opposite to the end face 15, a platform 16 is provided to provide spacing to accommodate the thicker section of the fiber ribbon 23. In this embodiment, the grooves 34 has a V-shaped cross-section.

FIGS. 4A-F illustrate various views of structural details of optical fiber assembly 10, in accordance with one embodiment of the present invention. In this embodiment, the sectional views of FIGS. 4C (taken alone line 4C-4C in FIG. 4A) and 4E (taken alone line 4E-4E in FIG. 4A) are substantially similar. It is noted that the sides 21 and 22 (or the lateral ends in the cross-sectional view) of the ferrule 12 are truncated with a generally flat surface or a surface with a substantially larger radius of curvature.

The sectional view of 4D (taken alone line 4D-4D in FIG. 4A) illustrates the region of the central floor 18. The sectional view of 4F (taken alone line 4F-4F in FIG. 4A) illustrates the region of the platform 16 that accommodates the thickness of the fiber ribbon 24.

Figure 5A:
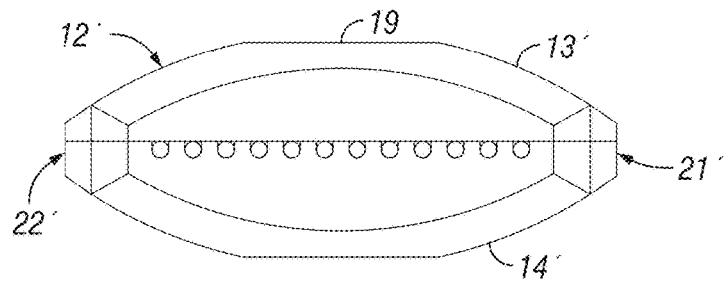
FIGS. 5A-B illustrate end views of ferrules incorporating other embodiments of alignment grooves.
Figure 5B:
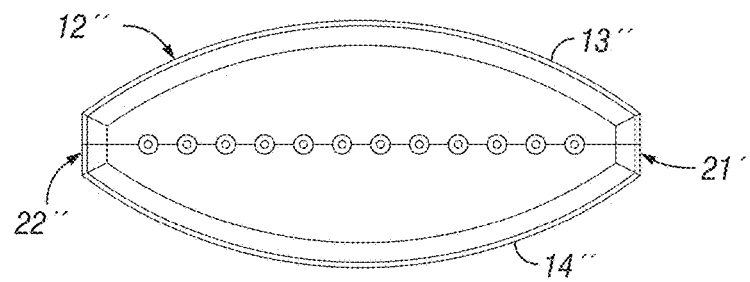

The previous embodiment shows V-shaped grooves in the ferrule halves. FIGS. 5A-B illustrate end views of ferrules incorporating other embodiments of alignment grooves having different cross-sectional geometries. FIG. 5A illustrates longitudinal U-shaped grooves provided in ferrule halve 14' and no groove is provided in ferrule halve 13', and FIG. 5B illustrates semi-circular or C-shaped grooves provides in ferrule halves 13" and 14". It is noted that the ferrule 12' in FIG. 5A is shown with a flat external surface section 19, which may or may not contact the sleeve for alignment of the ferrule, depending on the shape of the sleeve. It is further noted that the sides 21' and 22' (or the lateral ends in the cross-sectional view) of the ferrule 12' are truncated with a generally flat surface or a surface with a substantially larger radius of curvature, and the sides 21" and 22" (or the lateral ends in the cross-sectional view) of the ferrule 12" are also truncated with a generally flat surface or a surface with a substantially larger radius of curvature.

Figure 6A:
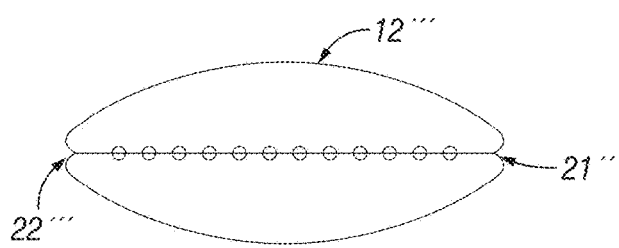
FIGS. 6A-E illustrate alternate embodiments of ferrules and sleeves.
Figure 6B:
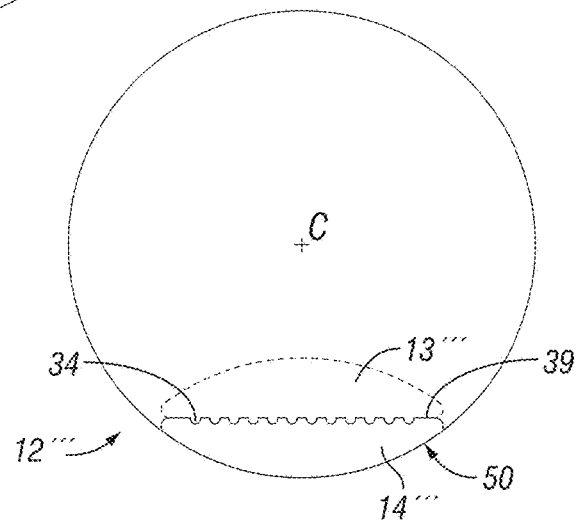
Figure 6C:
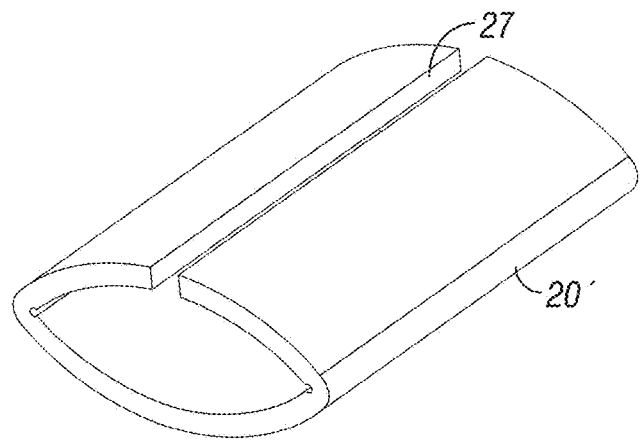
Figure 6D:
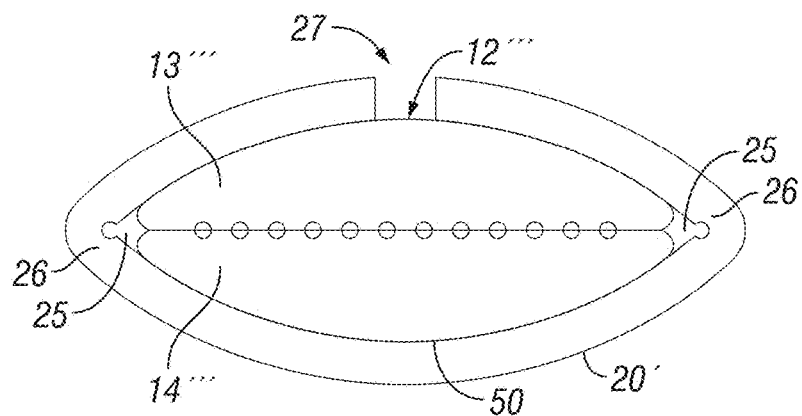
Figure 6E:
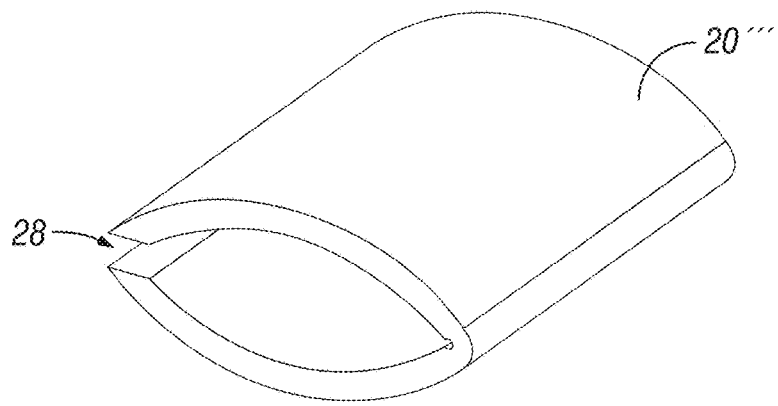

FIGS. 6A-E illustrate alternate embodiments of ferrules and sleeves. FIG. 6A shows that the sides 21''' and 22''' (or the lateral ends in the cross-sectional view) of the ferrule 13''' are truncated, with the surface curled inwards, as compared to the earlier embodiments. The exemplary dimensions shown are in mm. FIGS. 6C and 6D illustrates another embodiment of a split sleeve 20', which has a cutout 25 at the lateral corners 26 of the split sleeve 20', facing the truncated sides 21''' and 22'''. The cutout provides more flexibility at the shaper corners 26 of the split sleeve 20'. The split sleeve 20' has a slit 27 along the side of the narrow region (shorter axis) of the oval sleeve. Instead, a slit 28 may be provided along the side of the wider region (larger axis) of the oval sleeve 20", as shown in FIG. 6E.

In one aspect of the present invention, the inventive ferrule has an external surface for alignment with a complementary surface of an alignment sleeve (i.e., the inside surface of a generally cylindrical or tubular sleeve). Referring to FIG. 6B, the external surface profile of the oval shaped ferrule halve 14 will be discussed. The external surface 50 of the ferrule halve 14 in this embodiment is generally cylindrical, conforming to a circular arc having a center of curvature at C. From the perspective in the cross-section plane shown in FIG. 6B, the center C does not lie in the plane of the axis of the optical fibers held in the grooves 34 on the insider surface, or the geometric center of the array of fibers in the cross-section. The center C is not the geometric center of the ferrule halve 14''' or the overall ferrule 12''' when attached to ferrule halve 13''' in the cross-section (see also FIG. 4B). The center C does not lie in at least one of two-orthogonal planes of symmetry of the ferrule. The orthogonal planes of symmetry may be the plane of the fiber axis of the array of optical fibers and its orthogonal plane. Further the center does not lie in more than one plane of symmetry of the ferrule halve 14''', or the overall ferrule 12'''. In other words, for a symmetrical ferrule, the center C does not lie in the geometric center of the ferrule.

In the above described embodiments, all the ferrules and ferrule halves conform the respective conditions noted above. In all the above embodiments, with the exception of embodiment of FIG. 5A, curved surfaces similar to curved surface 50 in FIG. 6B comes into contact with the insider surface of the alignment sleeve. Referring to the example of FIG. 6D, the inside surface of alignment sleeve 20' comes into contact with the entire curved surfaces 50 of the ferrule 12''', except near the corners 26 and at the slit 12'''. It is the contact between the sleeve and the ferrule that contributes to and defines the alignment of the optical fiber supported in the ferrule with respect to the external geometry of the ferrule.

One can view the contact between the ferrule and the alignment sleeve to comprise of multiple points of contact in cross-section. More specifically, the plurality of points of contact between the ferrule and the sleeve are defined along a curve in cross-section (i.e., the curve corresponds to the contact interface between the sleeve and the ferrule surface 50 in the embodiment of FIG. 6D). It follows that the center of curvature at each of the contact points along this contact curve (i.e., the curve containing contact points that contribute to alignment) does not lie in the plane of the fiber axis of the array of optical fibers. The center of curvature at each of the contact points along the contact point curve does not lie in the geometric center of the array of optical fibers. For the embodiment of a symmetrical ferrule, the center of curvature at each of the alignment contact points along this contact point curve does not lie in at least one of two-orthogonal planes of symmetry of the ferrule. The planes of symmetry may be the plane of the axis of the array of optical fibers and its orthogonal plane. In other words, for a symmetric ferrule, the center of curvature at each of the contact points along the contact point curve does not lie in the geometric center of the ferrule.

In all the above embodiments, all or substantially all the alignment contact points along the contact point curve are subject to the respective conditions noted above. Further understanding of the contact curve will be discussed in reference to further embodiments below.

FIGS. 7A-E illustrate an optical fiber connector adopting the inventive ferrule and sleeve, in accordance with one embodiment of the present invention. What is shown are two connectors 60 (shown to be identical in this embodiment), each containing an optical fiber assembly 10 (FIG. 1) held in a housing conforming to certain industry standards. A coupler 62 is provided, which holds the sleeve 20, for receiving the ferrule 12 at each end. The coupler 62 has two T-shaped halves 63 (identical in the illustrated embodiment). To couple the connectors 60, the ferrule 12 of each connector is inserted into one end of sleeve 20 through the opening 64 in the T-shaped coupler halve 63.

Figure 7D:
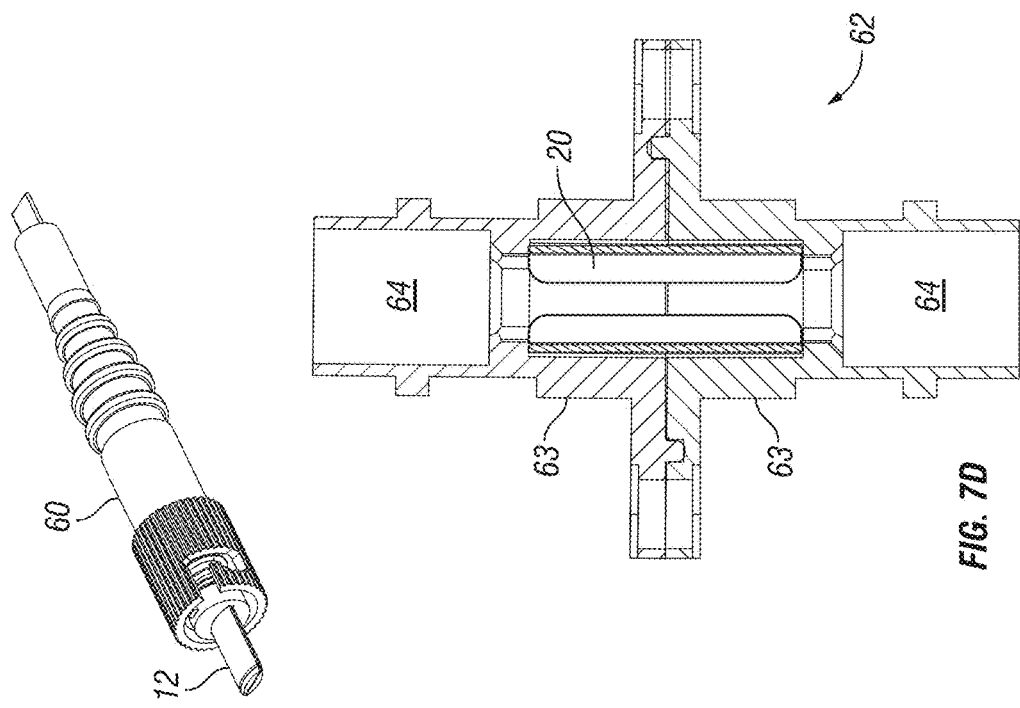
Figure 7C:
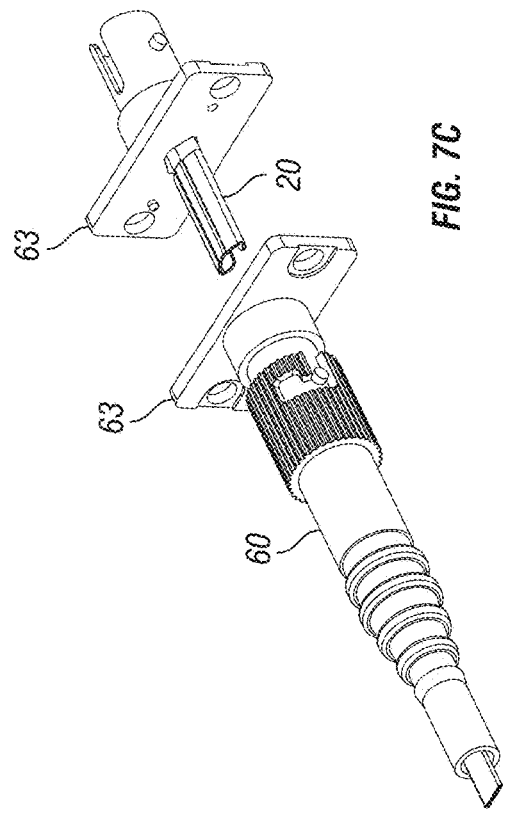
Figure 7E:
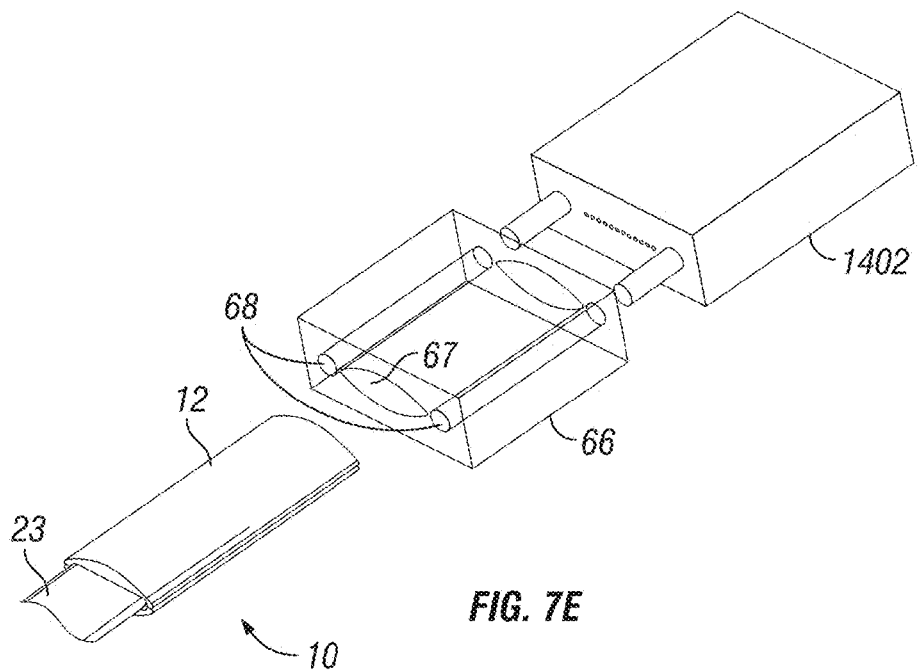
Figure 13:
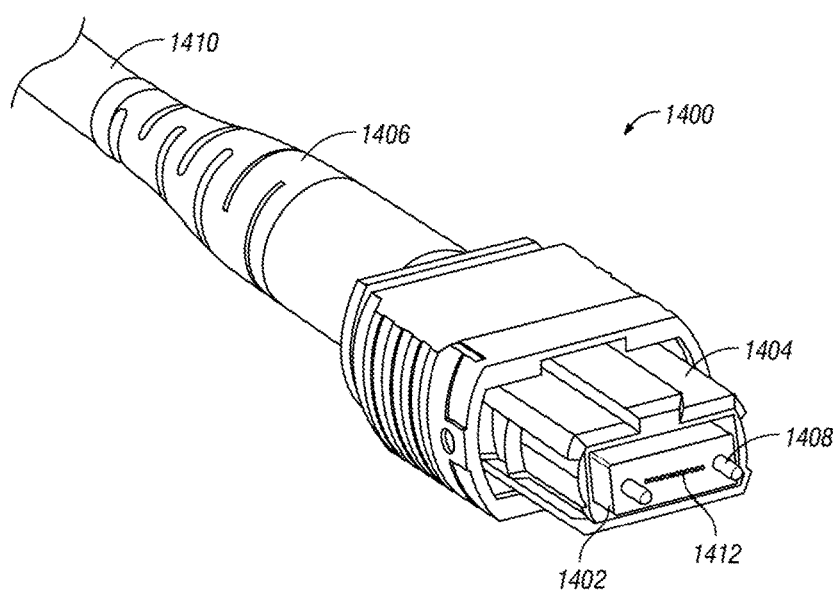
FIG. 13 illustrates a prior art optical fiber connector.

FIG. 7E illustrates how a fiber connector 10 of the present invention can be made backward compatible with a ferrule in a prior art connector (such as the ferrule 1402 in the prior art connector 1400 shown in FIG. 13). The ferrule 12 is inserted into an adaptor 66 having a through hole 67 matching the external profile of the ferrule 12. The adaptor 60 otherwise matches the ferrule 1402. The adaptor 60 is further provided with holes 68 for receiving alignment pins in the prior art ferrule 1402.

Figure 8A:
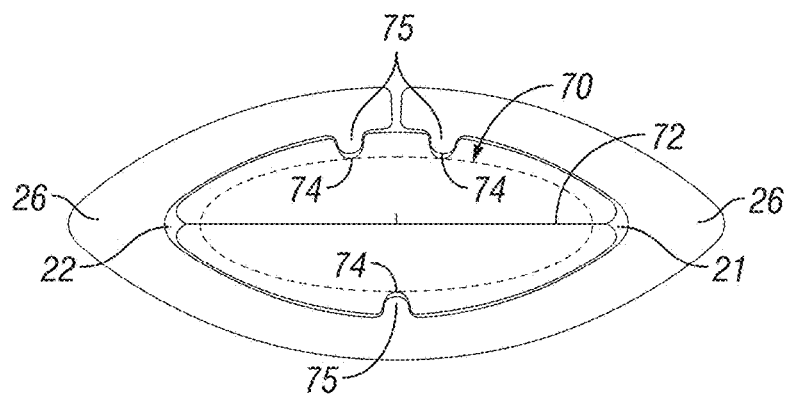
FIGS. 8A-B illustrate further ferrule and sleeve combinations, in accordance with further embodiments of the present invention.
Figure 8B:
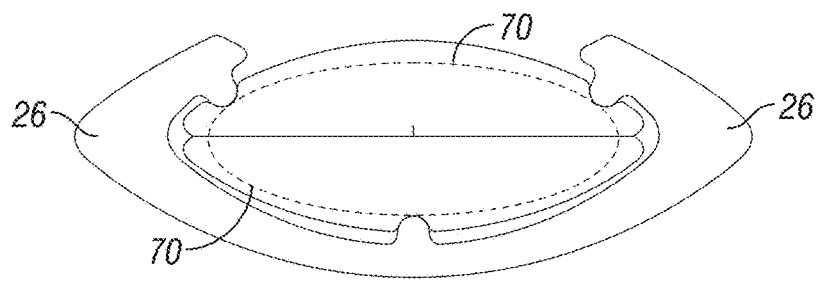
Figure 9A:
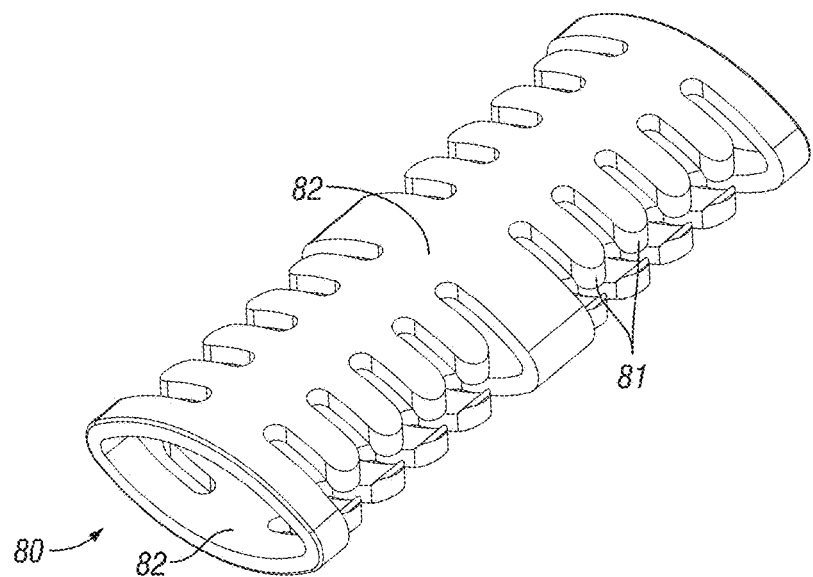
FIGS. 9A-E, 10A-I, 11A-E illustrate various views of sleeve structures having mating surface features for alignment of ferrules, which are three-dimensional varying in accordance with various embodiments of the present invention.
Figure 9B:
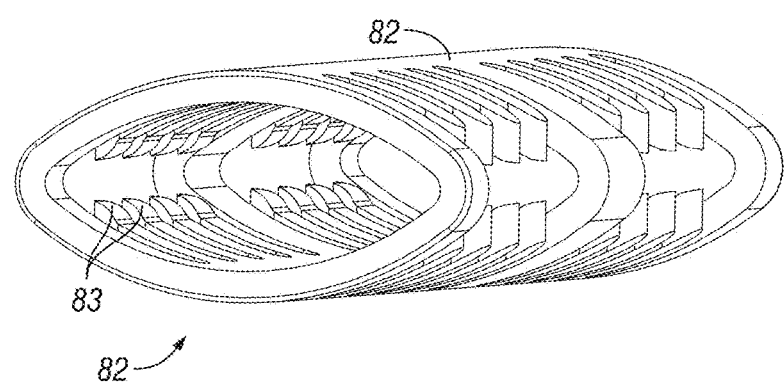
Figure 9C:
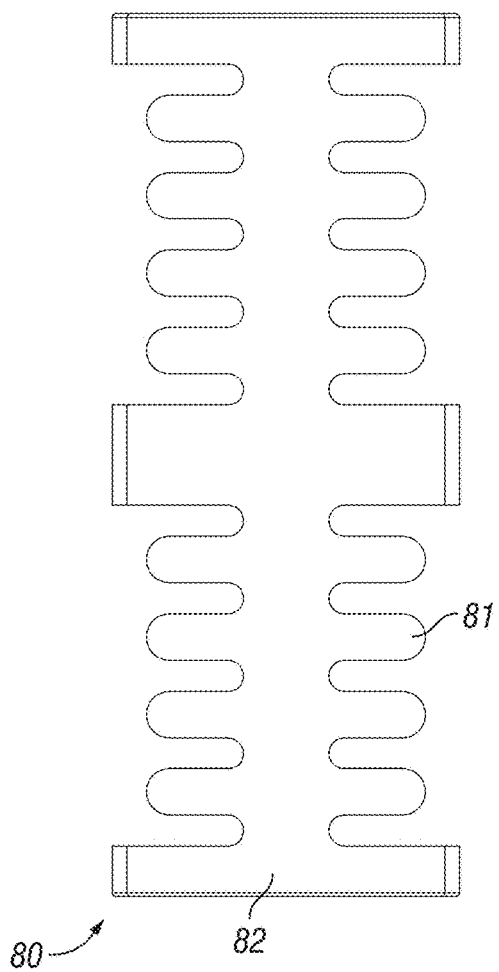
Figure 9D:
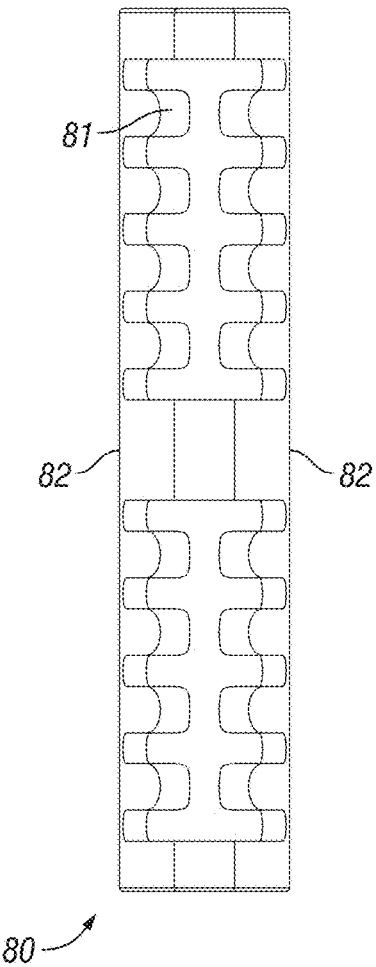
Figure 9E:
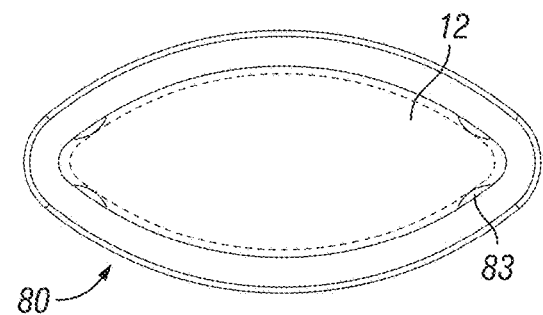
Figure 10A:
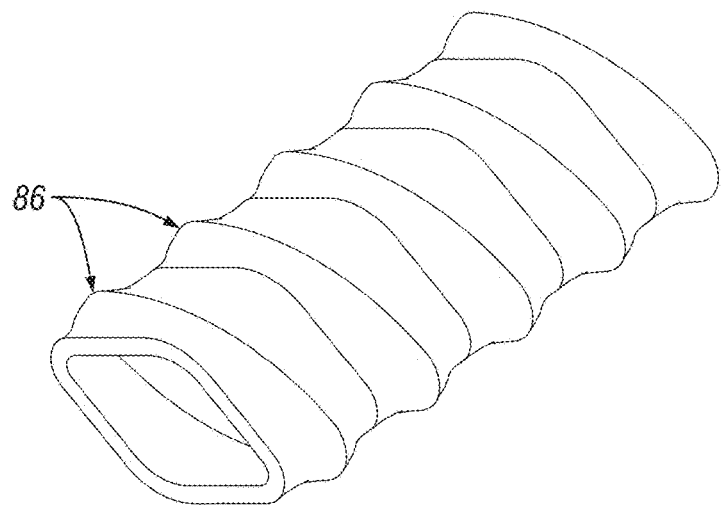
Figure 10B:
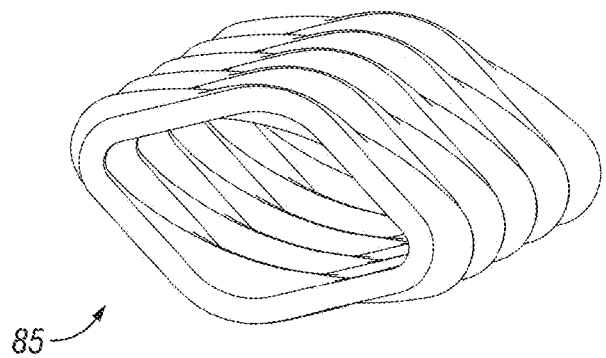
Figure 10C:
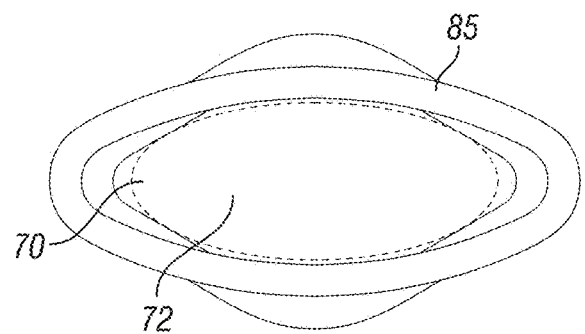
Figure 10D:
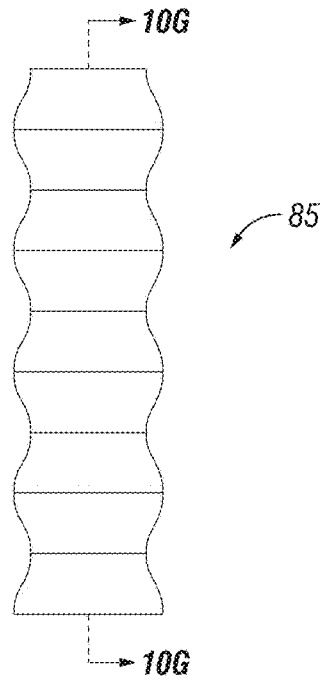
Figure 10E:
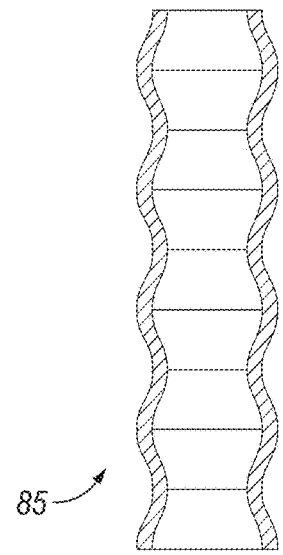
Figure 10F:
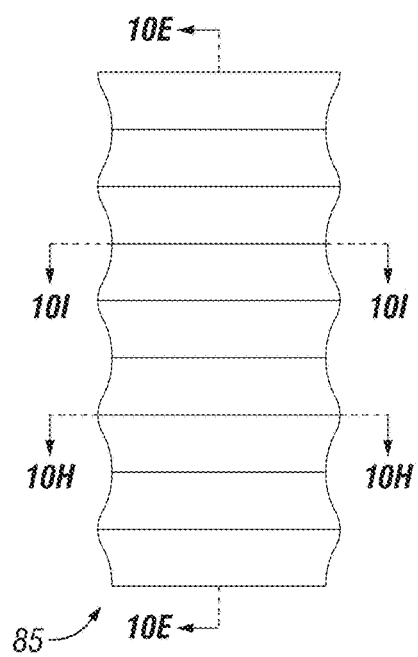
Figure 10G:
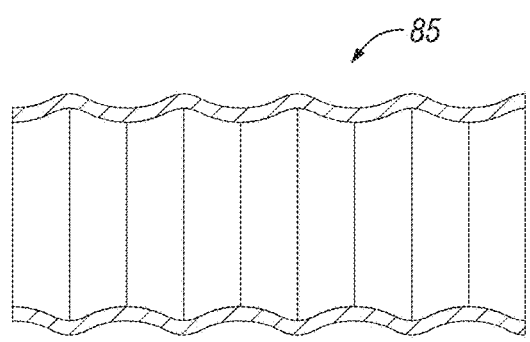
Figure 10H:
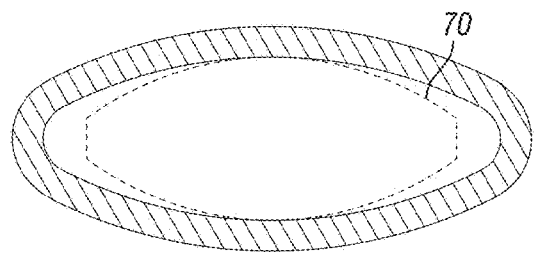
Figure 10I:
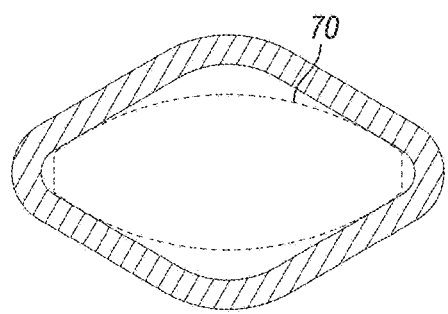
Figure 11A:
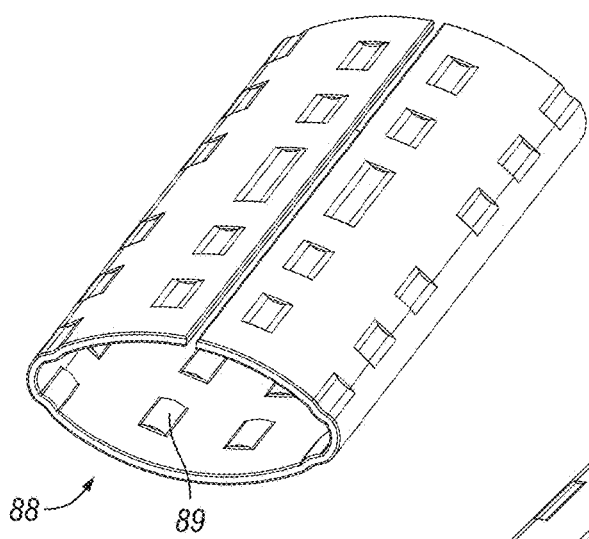
Figure 11B:
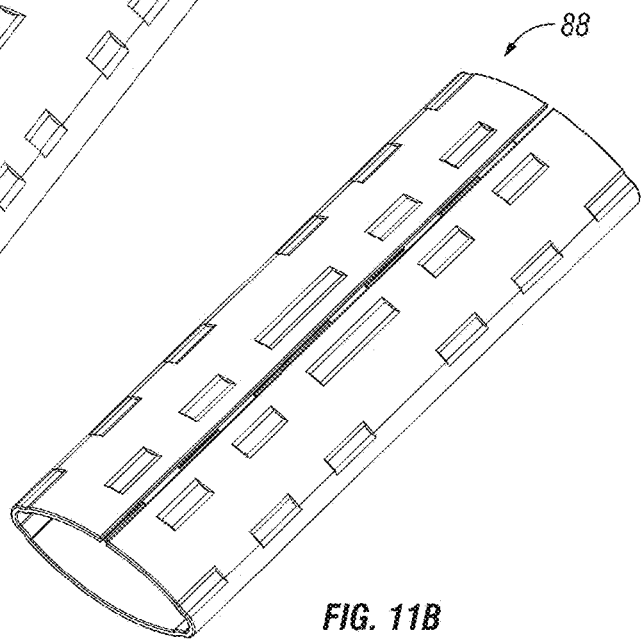
Figure 11C:
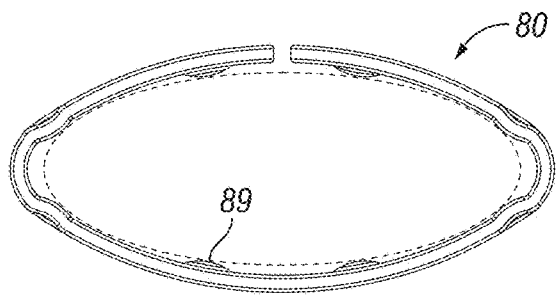
Figure 11D:
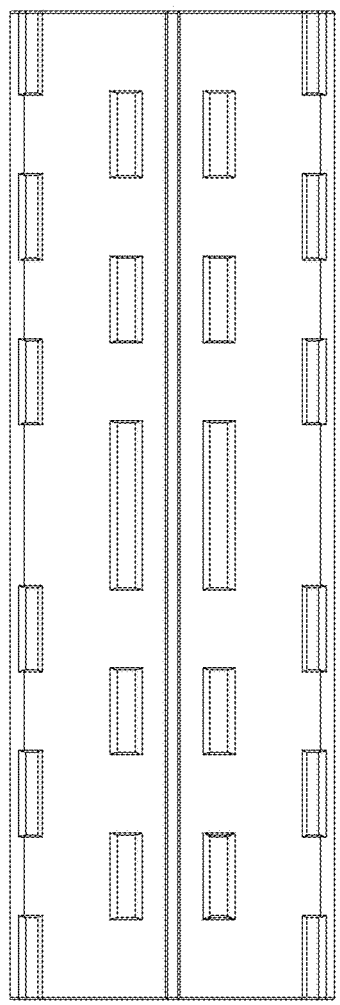
Figure 11E:
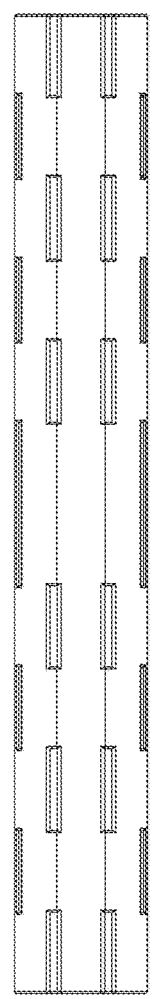

FIGS. 8A-B illustrate further ferrule and sleeve combinations, in accordance with further embodiments of the present invention. In these embodiments, semi-spherical dimples or semi-circular cylindrical grooves (74) are provided on the ferrule 72, and complementary semi-spherical spot protrusions or semi-circular cylindrical line protrusions (75) are provided, depending on whether a line contact (into the page) or a spot contact is desired. A curved contact line 70 is defined by the points of contact between the sleeve and the ferrule by the protrusions and dimples/grooves. In FIG. 8A, there may be additional points of contact outside of the areas of protrusions and dimples/grooves. As illustrated, the truncated sides 21 and 22 of the ferrule 72 do not come into contact with the sleeve.

Figure 14:
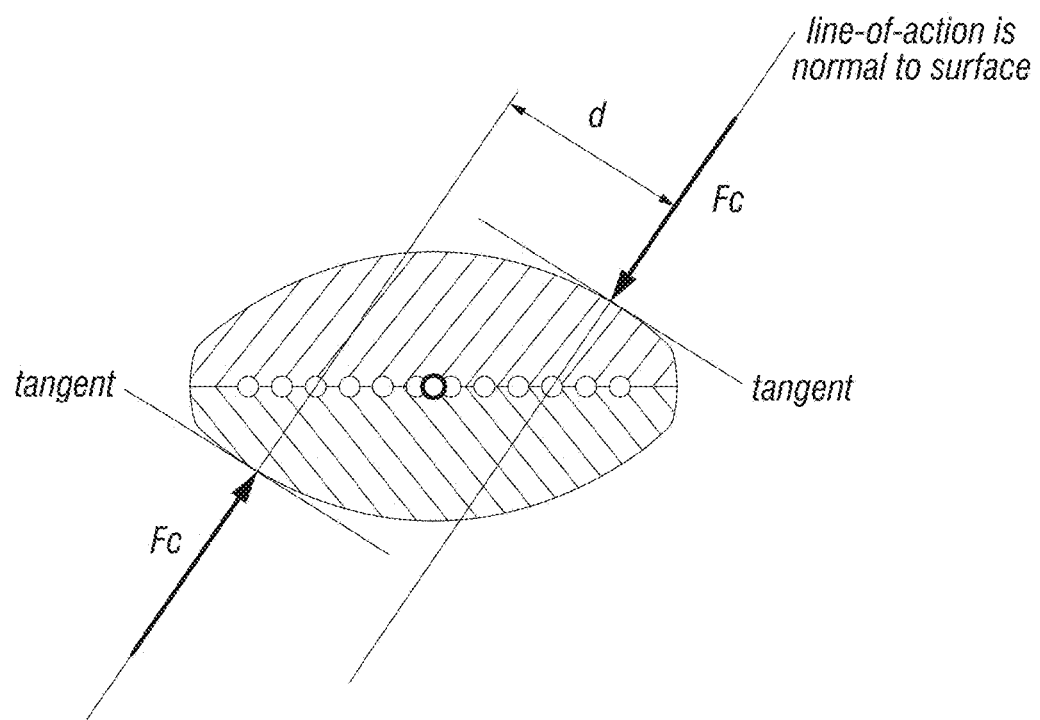
FIG. 14 is a schematic diagram explaining some design considerations of the present invention.

According to the present invention, the ferrule is self-aligning within the sleeve. No alignment pin is required, avoiding the problems of the prior art. The sleeve comes into direct contact with the ferrules. It is noted that the design consideration is to provide a combination of sleeve and ferrule such that the ferrule and sleeve work together in a self-orienting fashion because of the way the moment/couple Fc-d is generated if the ferrule is misaligned within the split sleeve. Referring to FIG. 14, if a ferrule is inserted into a split-sleeve but is not correctly oriented, contact between the ferrule and split-sleeve develops on opposite corners and the contact force acts normal to the curved surface. The normal to the curved surface sets the line-of-action of the contact force. The curved surface at the contact point should be such that the distance between two lines of action is adequate to generate the restoring couple. If a torque is applied to the ferrule or cable, then high contact forces develop at opposite edges to oppose rotational errors.

FIGS. 9A-E, 10A-I, and 11A-E illustrate sleeve structures having mating surface features for alignment of ferrules, which are three-dimensional varying in accordance with various embodiments of the present invention. The surface profile of the sleeves varies in cross-section as well as in the axial direction of the sleeve.

FIG. 9 illustrates an embodiment of a sleeve 80 having fingers 81 cantilevered from a backbone 82. The fingers 81 have tips that each defines a contact point with a ferrule 12. Referring to FIG. 9E, the tips 83 of the fingers 81 define in the cross section a contact curve 70 with the ferrule 12, comprising a series of contact points. The ferrule 12 may or may not be provided with matching dimples to lock with the tips 81.

FIG. 10 shows a non-split sleeve 85 having a tubular body that is corrugated in the axial direction. The corrugations 86 alternate along the axial direction. Referring to FIG. 10C, the corrugations on the sleeve 85 make certain point contacts with the ferrule 12, defining a contact curve 70 in cross-section. It is noted that the contact curve 70 comprises different set of contact points depending on the cross-section. Nevertheless, in the view depicted in FIG. 10C, the contact points at various cross-sections would define the substantially the same contact curve profile, given the ferrule 12 is substantially cylindrical and uniform in the axial direction.

FIG. 11 shows a split sleeve that is generally cylindrical tubular, having rectangular pimples 88 distributed over the insider surface and protruding on the inside surface of the sleeve 89. The pimples 89 on the sleeve 88 define a generally oval contact curve 70.

Instead of providing pimples and/or protrusions on the inside surface of the sleeve, pimples and/or protrusions may be provided on the outside surface of the ferrule instead. Complementary matching depressions (notches, grooves and the like) may be provided on the inside surface of the sleeve.

For all the contact curves discussed above, they conform to the earlier stated conditions.

The ferrule has an open structure that has precision features formed thereon, namely open fiber alignment grooves, which can securely retain (e.g., by clamping) the optical fibers without the need for epoxy or a complementary precision part. In one embodiment, the ferrule has a body having a plurality of open grooves formed in parallel on one surface thereof for receiving and clamping at least the terminating end sections of optical fibers. In a further embodiment, grooves may be provided in the ferrule body for alignment guide pins.

In one aspect of the present invention, sleeves have a generally tubular body, which have mating surface features for ferrule alignment which are two-dimensionally varying in a sectional plane, or three-dimensionally varying including in the direction of the longitudinal axis.

In another aspect of the present invention, the ferrule components and/or sleeves are precision formed by high throughput processes, such as stamping and extrusion. In another embodiment, the ferrule components are formed by extrusion of a blank through a die.

In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass).

The grooves 34 in the ferrules are structured to securely retain the optical fibers 24 (bare section with cladding exposed, without protective buffer and jacket layers) by clamping the optical fibers 24, e.g., by a mechanical or interference fit (or press fit). For example, the width of the grooves 34 may be sized slightly smaller than the diameter of the optical fibers 24, so that the optical fibers 24 are snuggly held in the grooves 34 by an interference fit. The interference fit assures that the optical fibers 24 is clamped in place and consequently the position and orientation of the ends of the optical fibers 24 are set by the location and longitudinal axis of the grooves 34. In one of the illustrated embodiments, the grooves 34 has a U-shaped cross-section that snuggly receive the bare optical fibers 24 (i.e., with the cladding exposed, without the protective buffer and jacket layers). The sidewalls of the groove 34 are substantially parallel, wherein the opening of the grooves may be slightly narrower than the parallel spacing between the sidewalls (i.e., with a slight C-shaped cross-section) to provide additional mechanical or interference fit for the optical fibers 24. Further details of the open groove structure can be found in copending U.S. patent application Ser. No. 13/440,970 filed on Apr. 5, 2012, which is fully incorporated by reference herein. The ferrule halve 14' provided with grooves is effectively a one-piece open ferrule supporting the optical fibers 24 with their ends in precise location and alignment with respect to each other and to the external geometry of the ferrule.

It can be appreciated that the open grooves can be more easily and precisely formed, compared to forming through-holes in a plastic ferrule block practiced in the prior art.

A precision stamping process and apparatus has been disclosed in U.S. Pat. No. 7,343,770, which was commonly assigned to the assignee of the present invention. This patent is fully incorporated by reference herein. The process and stamping apparatus disclosed therein may be adapted to precision stamping the ferrules of the present invention. The ferrule halves 13 and 14 may be attached together holding the optical fibers therein, by welding or soldering.

Figure 12:
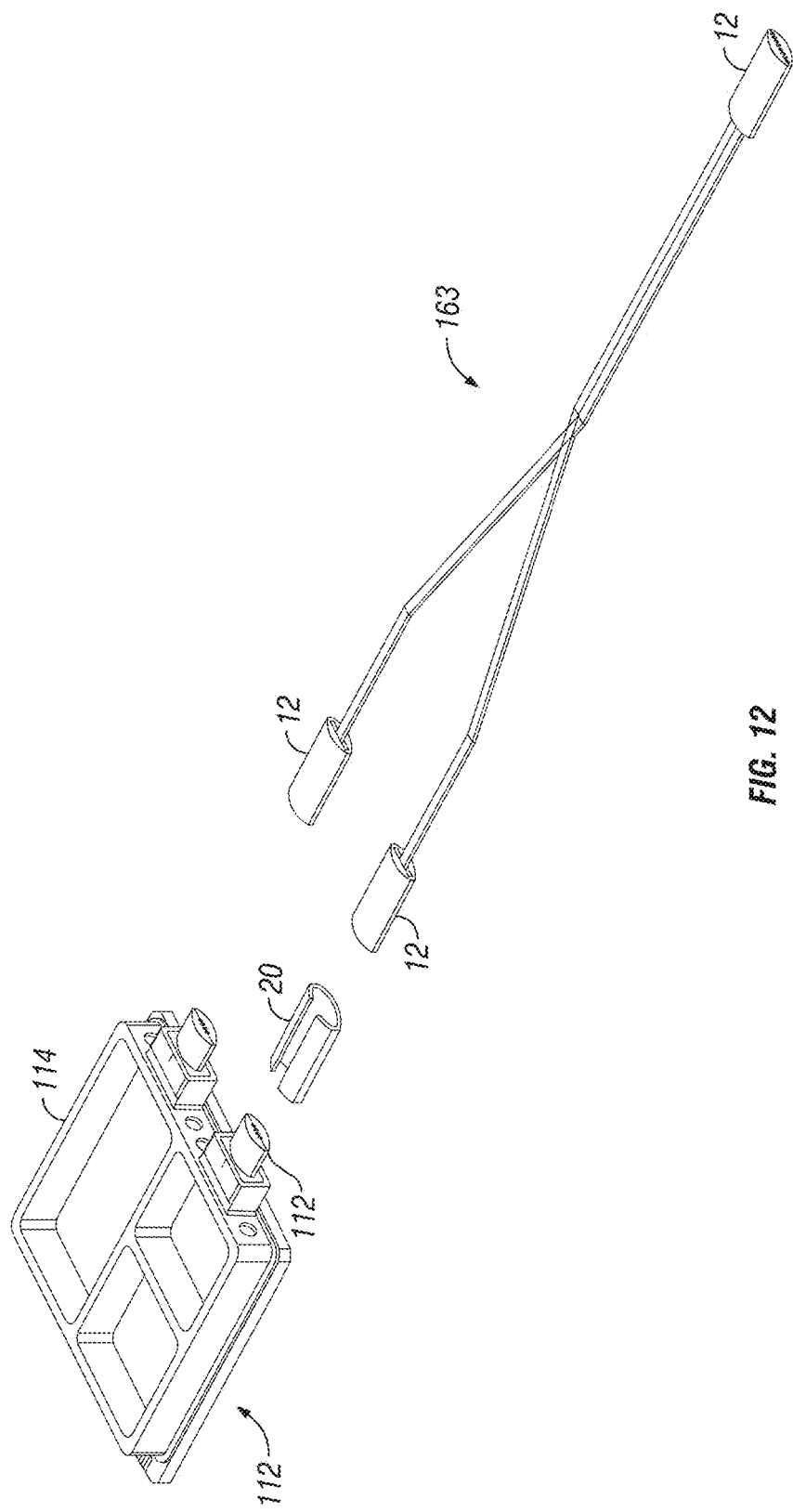
FIG. 12 is a schematic perspective view of an optoelectronic module housing, to which ferrules of the present invention may be applied as connectors.

Referring to embodiment illustrated in FIG. 12, the ferrule assembly 112 may be adapted to be a hermetic ferrule assembly, if the ferrule assembly 112 is hermetically sealed with the optical fiber 24 held therein. The ferrule assembly 112 is can be an adaption of the ferrule 12 in earlier embodiment, by aligning bare fibers at both ends of the ferrule assembly 112 instead of just one end of the ferrule 12 in earlier embodiment (i.e., the ferrule is symmetrical about an axis orthogonal to the longitudinal axis). In this embodiment, the ferrule assembly 112 is hermetically attached to the housing 114 of the opto-electronic module 112, having only bare optical fibers 24 (i.e., without buffer and protection jacket layers) held within the ferrule without extending at both ends appreciably beyond the end faces of the ferrule (i.e., the optical fibers held in the ferrule assembly 112 terminate substantially coplanar with both end faces of the ferule 112; one of the end faces of the ferrule assembly 112 being inside the module housing 114). In this embodiment, the fiber alignment grooves would be precisely formed (e.g., by stamping) at high tolerance for both ends of the optical fibers.

Accordingly, in this embodiment, the ferrule assembly 112 provides a demountable terminal for the module 112, for coupling to another optical device, such as an optical fiber ribbon (e.g., a patch cord 63 having similarly shaped ferrules 12 having oval cross-section), by using an alignment sleeve 20 (e.g., a split sleeve having complementary shape sized to receive the ferrule assembly 112 and the ferrule 12 on the patch cord 163). In this embodiment, the ferrule assembly 112 may be deemed to be a hermetic terminal of the module 112 having an alignment ferrule for optical alignment to external devices. With this embodiment, a defective external optical fiber ribbon may be replaced by plugging a replacement fiber ribbon onto the hermetical ferrule terminal, without having to replace the significantly more expensive module 112.

For the ferrules described above, given optical alignment of adjoining ferrules at the optical fiber connectors relies on alignment sleeves, the external surfaces of the ferrule should be maintained at high tolerance as well for alignment using an alignment sleeve. In the embodiments described above, no alignment pin is required for alignment of the ferrules. Accordingly, for stamping the ferrule portions (ferrule halves), that would include stamping the entire body of the ferrule portions, including forming the grooves, mating surfaces of the ferrule portions, and external surfaces that come into contact with sleeves. The sleeves may be precision formed by stamping as well. This maintains the dimensional relationship between the grooves and external alignment surfaces of the ferrules, to facilitate alignment using alignment sleeves only without relying on alignment pins.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A ferrule for supporting a plurality of optical fibers, comprising:
a body supporting an end section of the optical fibers, and having an external surface for alignment with a complementary surface of an alignment sleeve, wherein the external surface of the body is generally cylindrical, having a sectional contact surface profile that is generally oval in shape, wherein the body comprises a first ferrule halve having a first surface and a curved second surface and a second ferrule halve having a first surface and a curved second surface, wherein the first surface of the first ferrule halve opposes the first surface of the second ferrule halve, and the curved second surface of the first ferrule halve and the curved second surface of the second ferrule halve forming the generally cylindrical external surface of the body, wherein a plurality of longitudinal open grooves are provided on at least one of the first surface of the first ferrule halve and the first surface of the second ferrule halve, and wherein the first ferrule halve having the plurality of grooves is formed by stamping a metal blank.

2. The ferrule as in claim 1, wherein the ends of the ferrule along the longest axis in cross-section are truncated.

3. The ferrule as in claim 1, wherein the body comprises two ferrule halves, and wherein a plurality of longitudinal open grooves are provided on at least a surface of one of the ferrule halves.

4. A combination of ferrule and sleeve, comprising:
a ferrule as in claim 1; and
an alignment sleeve.

5. An opto-electronic module, comprising:
a housing; and
a ferrule as in claim 1, attached to the housing.

6. An optical fiber connector, comprising:
a ferrule as claimed in claim 1; and
a housing supporting the ferrule.

7. A ferrule for supporting a plurality of optical fibers, comprising:
a body supporting an end section of the optical fibers, and having an external surface for alignment with a complementary surface of an alignment sleeve, wherein the external surface of the body is generally cylindrical, having a sectional contact surface profile that is generally oval in shape, wherein a plurality of points of contact between the body and the sleeve are defined along a curve in cross-section, wherein the center of curvature at each of the contact points along the contact point curve does not lie in a plane of the axis of the plurality of optical fibers.

8. The ferrule as in claim 7, wherein the center of curvature at each of the contact points along the contact point curve does not lie in a geometric center of the plurality of optical fibers.

9. The ferrule as in claim 7, wherein the center of curvature at each of the contact points along the contact point curve does not lie in at least one of two-orthogonal planes of symmetry of the body.

10. The ferrule as in claim 9, wherein the planes of symmetry comprise the plane of the axis of the plurality of optical fibers and its orthogonal plane.

11. The ferrule as in claim 9, wherein the center of curvature at each of the contact points along the contact point curve does not lie in a geometric center of the plurality of optical fibers.

12. The ferrule as in claim 7, wherein the body comprises two ferrule halves, and wherein a plurality of longitudinal open grooves are provided on at least a surface of one of the ferrule halves.

13. A method of producing a ferrule as in claim 12, comprising forming the ferrule halve having the plurality of grooves by stamping a metal blank.

14. The ferrule as in claim 7, wherein the ends of the ferrule along the longest axis in cross-section are truncated.

15. A combination of ferrule and sleeve, comprising:
a ferrule as in claim 7; and
an alignment sleeve.

16. The combination as in claim 15, wherein the sleeve has a corrugated tubular body.

17. The combination as in claim 15, wherein the sleeve has a generally cylindrical body, having a backbone with fingers cantilevered therefrom.

18. The combination as in claim 15, wherein the sleeve has a generally cylindrical body, having protruding pimples distributed on an insider surface.

19. An optical fiber connector, comprising:
a ferrule as claimed in claim 7; and
a housing supporting the ferrule.

20. An opto-electronic module, comprising:
a housing; and
a ferrule as in claim 7, attached to the housing.

21. A method of producing a ferrule that comprises a body supporting an end section of the optical fibers, and having an external surface for alignment with a complementary surface of an alignment sleeve, wherein the external surface of the body is generally cylindrical, having a sectional contact surface profile that is generally oval in shape, wherein the body comprises two ferrule halves, wherein a plurality of longitudinal open grooves are provided on at least a surface of one of the ferrule halves, the method comprising forming the ferrule halve having the plurality of grooves by stamping a metal blank.

* * * * *